(12) United States Patent
Bartholow

(10) Patent No.: US 12,324,420 B2
(45) Date of Patent: Jun. 10, 2025

(54) BIRD FEEDER WITH SQUIRREL RESISTING FEATURES

(71) Applicant: Dudley Bartholow, Independence, MN (US)

(72) Inventor: Dudley Bartholow, Independence, MN (US)

( * ) Notice: Subject to any disclaimer, the term of this patent is extended or adjusted under 35 U.S.C. 154(b) by 127 days.

(21) Appl. No.: 18/370,023

(22) Filed: Sep. 19, 2023

(65) Prior Publication Data

US 2024/0122161 A1 Apr. 18, 2024

Related U.S. Application Data

(63) Continuation-in-part of application No. 17/313,478, filed on May 6, 2021, now abandoned, which is a continuation-in-part of application No. 15/993,176, filed on May 30, 2018, now abandoned.

(60) Provisional application No. 62/529,162, filed on Jul. 6, 2017, provisional application No. 62/512,783, filed on May 31, 2017.

(51) Int. Cl.
*A01K 39/00* (2006.01)
*A01K 39/01* (2006.01)

(52) U.S. Cl.
CPC ................................ *A01K 39/0113* (2013.01)

(58) Field of Classification Search
CPC .. A01K 39/012; A01K 39/0113; A01K 39/01; A01K 39/0206; A01K 39/04
USPC ............ 119/53, 52.2, 52.1, 51.01, 57.8, 57.9
See application file for complete search history.

(56) References Cited

U.S. PATENT DOCUMENTS

| | | | | |
|---|---|---|---|---|
| 5,269,242 | A * | 12/1993 | Toldi | A01K 39/012 |
| | | | | 119/52.2 |
| 7,171,921 | B1 * | 2/2007 | Lush | A01K 39/0113 |
| | | | | 119/57.9 |
| 9,179,650 | B2 * | 11/2015 | Gauker | A01K 39/02 |
| 2011/0297095 | A1 * | 12/2011 | Cruz | A01K 39/012 |
| | | | | 119/80 |
| 2018/0000052 | A1 * | 1/2018 | Donegan | B65B 1/04 |

* cited by examiner

*Primary Examiner* — Richard T Price, Jr.
(74) *Attorney, Agent, or Firm* — Mark A. Litman & Associates, P.A.

(57) ABSTRACT

A birdfeeder apparatus for discouraging squirrels from accessing birdfeed in the birdfeeder apparatus may comprise a feed holder configured to contain a quantity of birdfeed and having a perimeter wall with an upper portion and a lower portion, with the upper portion and the lower portion of the feed holder each having a width. The apparatus may also comprise at least one feed opening being located on the lower portion and extending through the perimeter wall of the feed holder, and a perch configured to support a bird feeding at the at least one feed opening, with the perch being located adjacent to the at least one feed opening on the lower portion of the perimeter wall and extending outwardly from the perimeter wall. The width of the upper portion may be larger than the width of the lower portion.

18 Claims, 22 Drawing Sheets

US 12,324,420 B2

BIRD FEEDER WITH SQUIRREL RESISTING FEATURES

REFERENCE TO RELATED APPLICATIONS

This application is a continuation-in-part of U.S. patent application Ser. No. 16/313,894, filed 7 Dec. 2018, which is in turn a continuation-in-part of U.S. patent application Ser. No. 15/993,176, filed May 30, 2018, and claims the benefits of U.S. Provisional Patent Application No. 62/512,783, filed May 31, 2017, and U.S. Provisional Patent Application No. 62/529,162, filed Jul. 5, 2017, each of which is hereby incorporated by reference in their entireties.

BACKGROUND OF THE ART

Field of the Invention

The present disclosure relates to bird feeders and more particularly pertains to a new bird feeder with squirrel resisting features for frustrating the attempts of squirrels to gain useful paw-holds on the feeder or descend down onto the perches of the feeder.

SUMMARY OF THE INVENTION

In one aspect, the present disclosure relates to a birdfeeder apparatus for discouraging squirrels from accessing birdfeed in the birdfeeder apparatus. The birdfeeder apparatus may comprise a feed holder configured to contain a quantity of birdfeed and having a perimeter wall with an upper portion and a lower portion, with the upper portion and the lower portion of the feed holder each having a width. The apparatus may also comprise at least one feed opening being located on the lower portion and extending through the perimeter wall of the feed holder, and may also include a perch configured to support a bird feeding at the at least one feed opening. The perch may be located adjacent to the at least one feed opening on the lower portion of the perimeter wall and extending outwardly from the perimeter wall. The width of the upper portion may be larger than the width of the lower portion such that substantially an entirety of the perch is positioned below the upper portion of the feed holder.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION OF THE INVENTION

Figure 1:
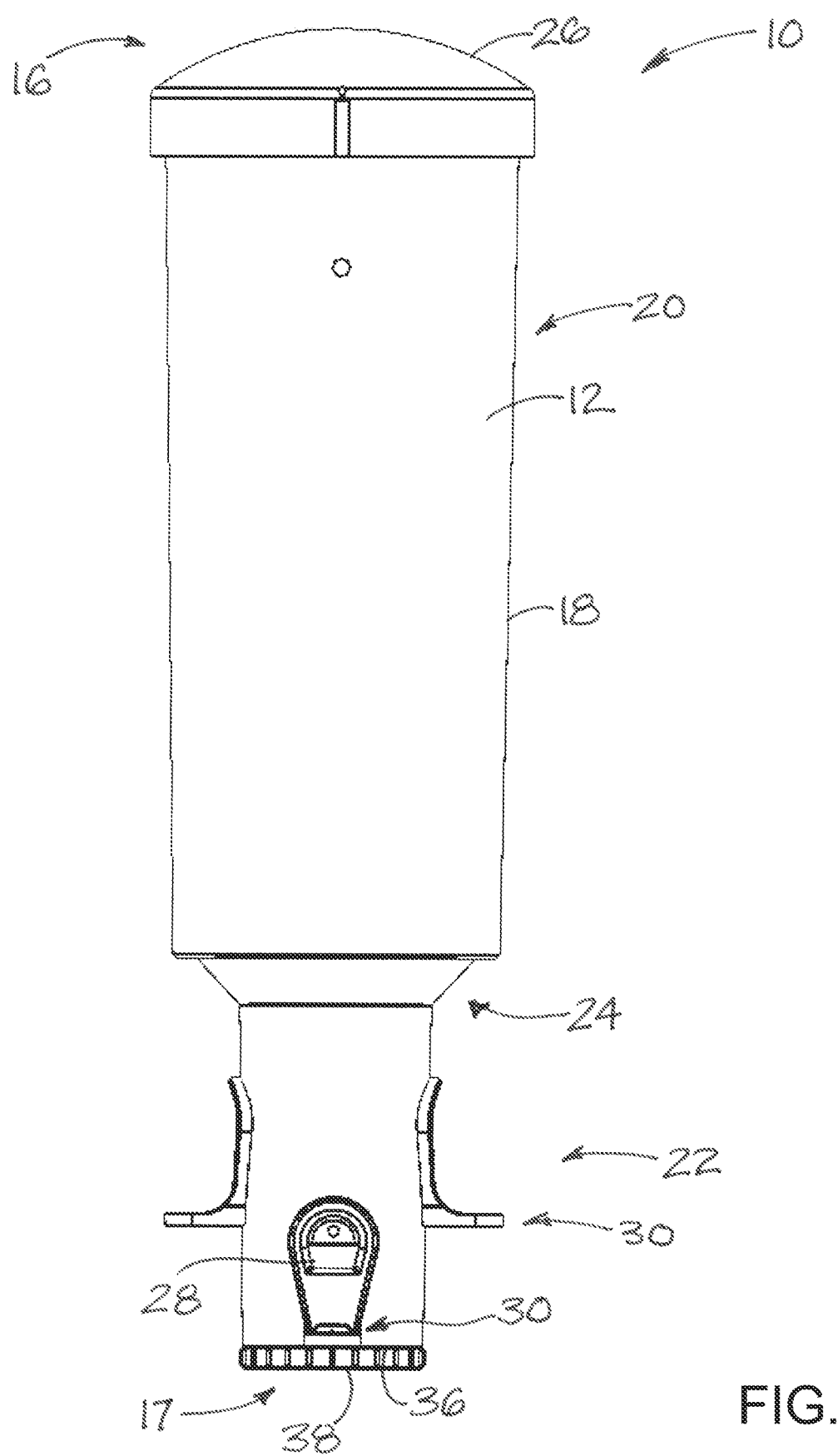
FIG. 1 is a schematic side view of a new bird feeder apparatus with squirrel resisting features according to the present disclosure.

With reference now to the drawings, and in particular to FIGS. 1 through 15 thereof, a new bird feeder with squirrel resisting features embodying the principles and concepts of the disclosed subject matter will be described.

The disclosure relates to a birdfeeder apparatus 10 for discouraging animals, and in particular rodents such as squirrels, from accessing bird feed located in (and dispensed by) the birdfeeder apparatus. The disclosure also relates to various structures that may be utilized with various other birdfeeder apparatus to achieve some of the advantages and benefits of the disclosure.

The birdfeeder apparatus 10 may include a feed holder 12 which may define an interior 14 for holding a quantity of bird feed and which may make the bird feed accessible to birds. The feed holder 12 may have an upper end 16 and a lower end 17 with the upper end being located relatively higher than the lower end when the apparatus 10 is in the normal orientation for use. The feed holder 12 may have a length defined between the upper 16 and lower 17 ends. The feed holder 12 may be substantially hollow to define the interior 14 for containing the bird feed. The feed holder 12 may include a perimeter wall 18 which may be formed by a substantially rigid material, and may be formed by a substantially transparent material to permit viewing of the contents of the holder to determine the need to add additional feed.

The feed holder 12 may comprise an upper portion 20 which is located toward the upper end 16 of the feed holder and a lower portion 22 located toward the lower end 17 of the feed holder. In some embodiments, a transition portion 24 may be positioned or located between the upper 20 and lower 22 portions of the feed holder, and may function to join the lower portion 22 to the upper portion 20. The upper 20 and lower 22 portions may each have a width measured in a direction oriented substantially perpendicular to the length of the feed holder. In some embodiments, the perimeter wall 18 may have a substantially cylindrical shape and the width of each of the upper and lower portions may comprise a diameter, although other cross sectional shapes may be employed for the holder. For example, the perimeter wall, and the corresponding upper and lower portions, may each have a cross sectional configuration of rectangular or square or other shape.

Significantly, in some embodiments the upper portion and the lower portion have different widths, with the width of the upper portion being larger than the width of the lower portion. The transition portion 24 may extend between the relatively larger width of the upper portion and the relatively smaller width of the lower portion. In embodiments of the holder 12 with cylindrical shapes, the diameter of the upper portion may be relatively larger than the diameter of the lower portion. The transition portion 24 may thus form an overhang of the upper portion with respect to the lower portion. In some embodiments, the transition portion 24 may have a substantially frustrated conical shape (shown in broken lines in FIG. 1), and in some embodiments the transition portion may have an annular disk shape (shown in solid lines in FIG. 1). Optionally, the transition portion of the wall may even slope inwardly and upwardly from the upper portion to the lower portion, or even upwardly and inwardly and then downwardly and inwardly to the lower portion. In some embodiments, a skirt section 27 of the perimeter wall (see FIG. 3) may extend downwardly from the upper portion past the uppermost extent of perimeter wall forming the transition portion to further frustrate the efforts of the squirrels attempting to grab onto structures on the lower portion of the feed holder.

At least one feed opening 28 may be provided on the feed holder 12, and may be located on the lower portion 22. In some embodiments, a plurality of feed openings may be provided. The one or more feed openings 28 may extend through the perimeter wall 18 of the feed holder such that feed held in the interior 14 of the feed holder is able to pass through the perimeter wall, such as through the actions or activity of feeding birds. The plurality of feed openings 28 may be located on the perimeter wall at substantially equal spacings or separations from each other, such as about the circumference of the lower portion.

The birdfeeder apparatus 10 may also include a perch 30 for supporting a bird feeding at the at least one feed opening may also be provided. The perch 30 may be located adjacent to one of the feed openings 28, and each opening may have a perch associated with it. The perch may be mounted on the perimeter wall 18 and may extend radially outwardly from the exterior surface of the perimeter wall in a substantially horizontal orientation. The perch 30 may have an inner end 32 which is located adjacent to the perimeter wall and may be mounted on the perimeter wall, The perch may also have an outer end 34 which is located opposite of the inner end 32, and may be a free end. The perch 30 may have a length between the inner 32 and outer 34 ends.

Significantly, the length of the perch 30 may be configured such that a significant portion, or even an entirety, of the length of the perch 30 is positioned below the upper portion 20 of the feed holder and as well as the transition portion 24 if present. The perch may not extend, or may not extend to an appreciable degree, beyond the vertical plane of the upper portion of the perimeter wall at the location of the perch. Illustratively, some embodiments of the feed holder may have an upper portion 20 with a diameter or width of approximately 6 inches to approximately 7 inches, while the lower portion 22 may have a diameter or width of approximately 2 inches to approximately 3 inches, although other sizes may also be used.

In some embodiments of the apparatus 10, the upper end 16 of the feed holder 12 may be configured to resist gripping of the upper end by the paw of a rodent such as a squirrel, and may have a shape that squirrels cannot easily and reliably jump to and land on to use as a platform for attempting to reach the seed dispensing openings below. The upper end of the feed holder may have an upper surface 26 with a shape which resists or prevents the gripping of the upper surface by the claws of the squirrel. In some embodiments, the upper surface 26 may have a dome shaped wall (see FIG. 2B). In some other embodiments, the upper surface 26 may have an inverted cone or conical shape (see FIG. 2C) that tapers narrower in an upward direction. In some further embodiments, the upper surface 26 of the feed holder may have a flat or planar shape which lacks any protruding edge (see FIG. 3C) which might provide a paw-hold for a squirrel, and may be slightly rounded at the location where the upper surface of the top wall meets the outer surface of the perimeter wall. The diameter of the upper portion 20 may also be large enough that squirrels of typical size are unable to embrace and hold onto a substantial enough portion of the outer surface of the perimeter wall to support themselves.

In some embodiments of the apparatus 10, a fill opening may be formed on the feed holder 12 to permit filling of feed into the interior 14 of the holder 12. A filler cap may also be removably mounted on the feed holder to selectively close the fill opening, and the filler cap may be generally horizontally oriented when the apparatus 10 is oriented for use. Illustratively, a fill opening 36 may be located on the lower end 17 of the feed holder such that the feed holder may be inverted to fill the feed holder through the opening 36 (see FIG. 1). A filler cap 38 may be mounted on the lower end 17 of the feed holder in order to selectively close the fill opening 36. The upper end 16 of the feed holder may be permanently closed against opening or removal of portions that would permit filling of the interior. Such a configuration may be useful in eliminating from the upper end 16 of the feed holder structure that would aid the gripping of the feed holder by the paws of a squirrel.

In other embodiments, the fill opening may comprise an upper fill opening 40 which is located at the upper end 16 of the feed holder (see FIG. 2B), and the filler cap may comprise an upper filler cap 42 which is mountable on the upper end 16 of the feed holder to selectively close the fill opening. The upper filler cap 42 may have an upper surface 44, and the upper surface may have a dome shape, or an inverted cone or conical shape, or even a flat shape which lacks a protruding edge which may provide a paw-hold for a squirrel. The upper filler cap 42 may be removably mounted on the perimeter wall 18 of the feed holder in any suitable manner, such as, for example, through the use of complementary threads on the cap 42 and the perimeter wall 18, or through the use of guide wires that extend from the perimeter wall to guide the movement of a cap between a closed position against the perimeter wall, and an open position away from the upper fill opening 40 of the perimeter wall, or through the use of a "snap on/snap off" type of interference relationship between the cap and wall 18, or other suitable structure.

Optionally, one or more vents 46 may be provided for ventilating the interior 14 of the feed holder 12, and the vent or vents may be formed on the upper portion 20 of the feed holder toward the uppermost portion of the perimeter wall 18. In some embodiments, the vents 46 may extend into the perimeter wall 18 from the upper fill opening 40 at the upper end 16 toward the lower end 17 of the feed holder, and may be at least partially covered by the fill cap 42. Bump outs or inward protrusions from the inner surface of the cap 42 may form air flow gaps through which air may flow into the covered vents while advantageously minimizing the opportunity for moisture from precipitation to pass through the vents into the interior 14 of the feed holder. In other embodiments, the vent 46 may be located just below the position of the upper fill cap 42 when the cap is mounted on the body. As a further option, the vent or vents 46 may be formed on the cap itself.

The apparatus 10 may also include a suspending structure 50 (see FIG. 6) which is configured to suspend the feed holder 12 from a support located above the feed holder. The suspending structure 50 may comprise an elongate member 52 which may have an upper end 54 and a lower end 55. The elongate member 52 may comprise a cord or cable or other relatively thin and flexible structure capable of resisting a degree of tension to support the feed holder without any significant stretching.

In some embodiments, a portion of the elongate member 52 may be formed into a loop 56 and the loop may be located above the feed holder when the feed holder is suspended by the elongated member from the support. To accomplish this, the feed holder 12 may be inverted or substantially inverted and a portion of the feed holder may be inserted into the loop 56 to thereby hold the feed holder in an inverted condition for filling of the interior of the feed holder. A feed holder having a lower fill opening 36 with a lower filler cap 38 may be utilized in combination with the loop 56 such that upon inverting and inserting the feed holder into the loop, the lower filler cap 38 may be removed from the lower fill opening 36 and a quantity of bird feed may be moved through the lower fill opening 36 to fill the interior. Once the desired quantity of bird feed has been dispensed into the interior 14 through the lower fill opening 36, the lower filler cap 38 may be re-mounted on the lower end 17 of the feed holder and the feed holder may be removed from the loop 56 such that the feed holder is able to be suspended in the normal upright orientation for use. In some embodiments, a pulley may be positioned above the feed holder and may receive a portion of the elongate member 52 to permit the elongate member to move through the pulley and relative to the support positioned above the feed holder to raise and lower the vertical height of the feed holder as needed.

Figure 4:
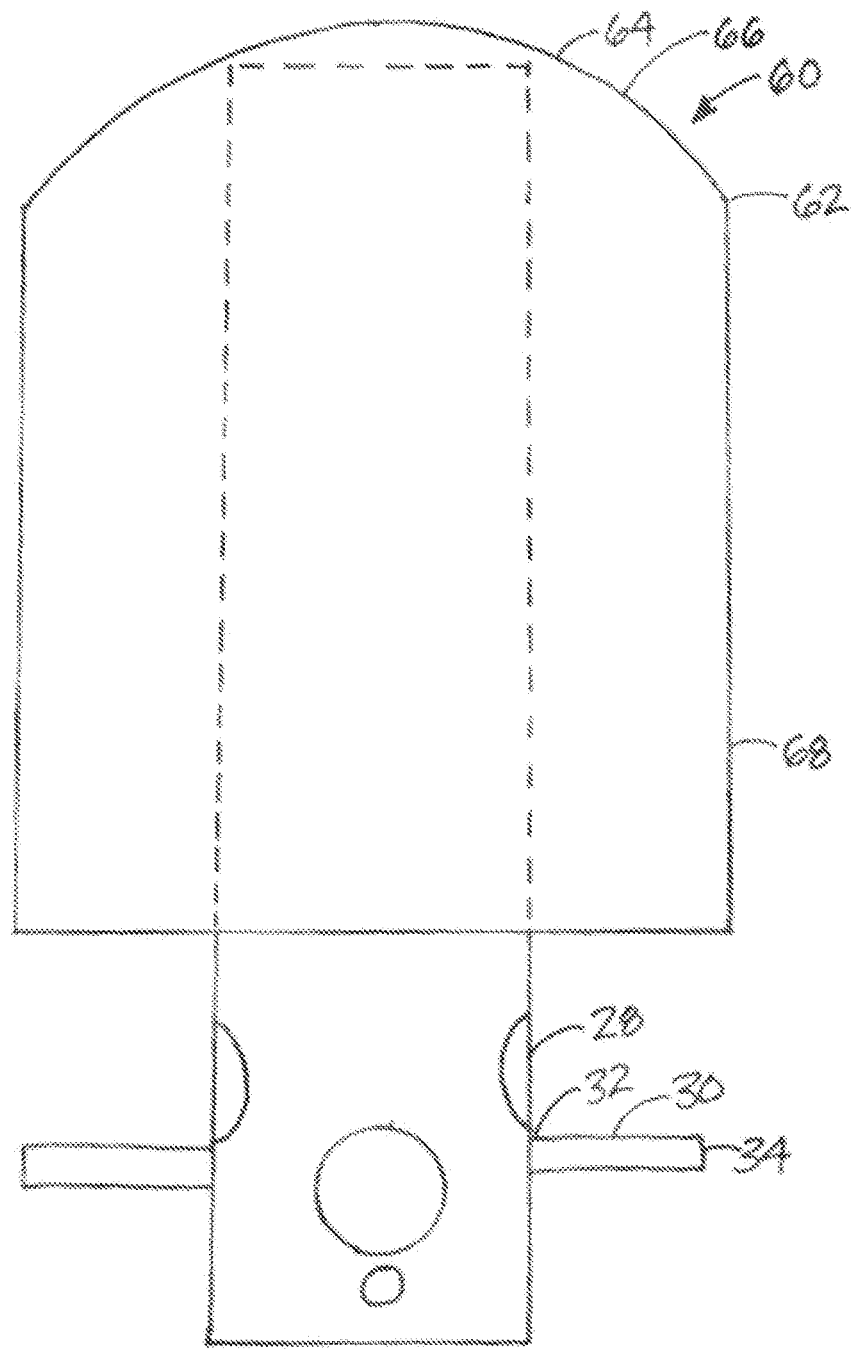
FIG. 4 is a schematic side view of an optional feeder cap mounted on a bird feeder, according to an illustrative embodiment.
Figure 5:
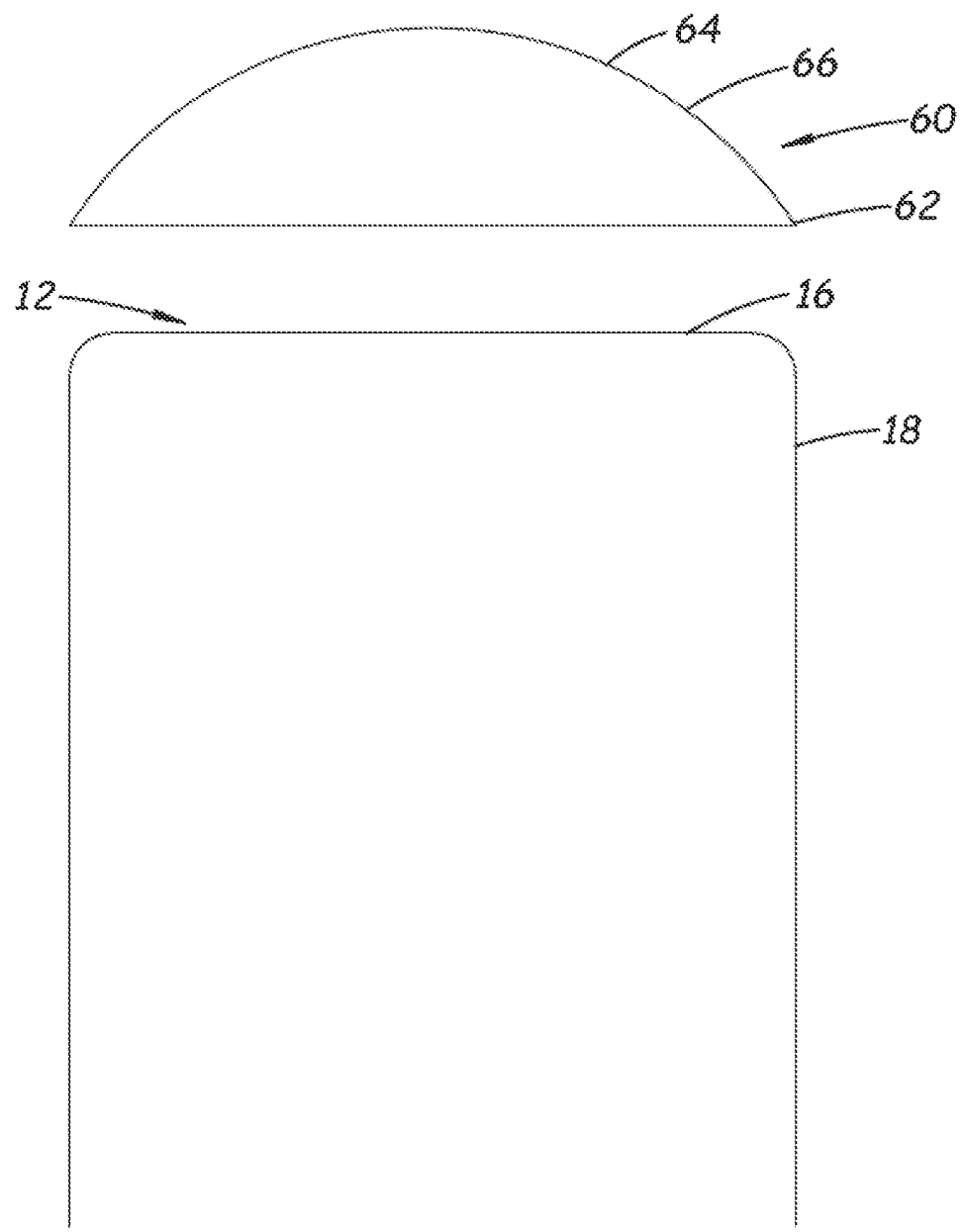
FIG. 5 is a schematic exploded side view of an optional feeder cap configuration and a top section of a bird feeder, according to an illustrative embodiment.
Figure 6:
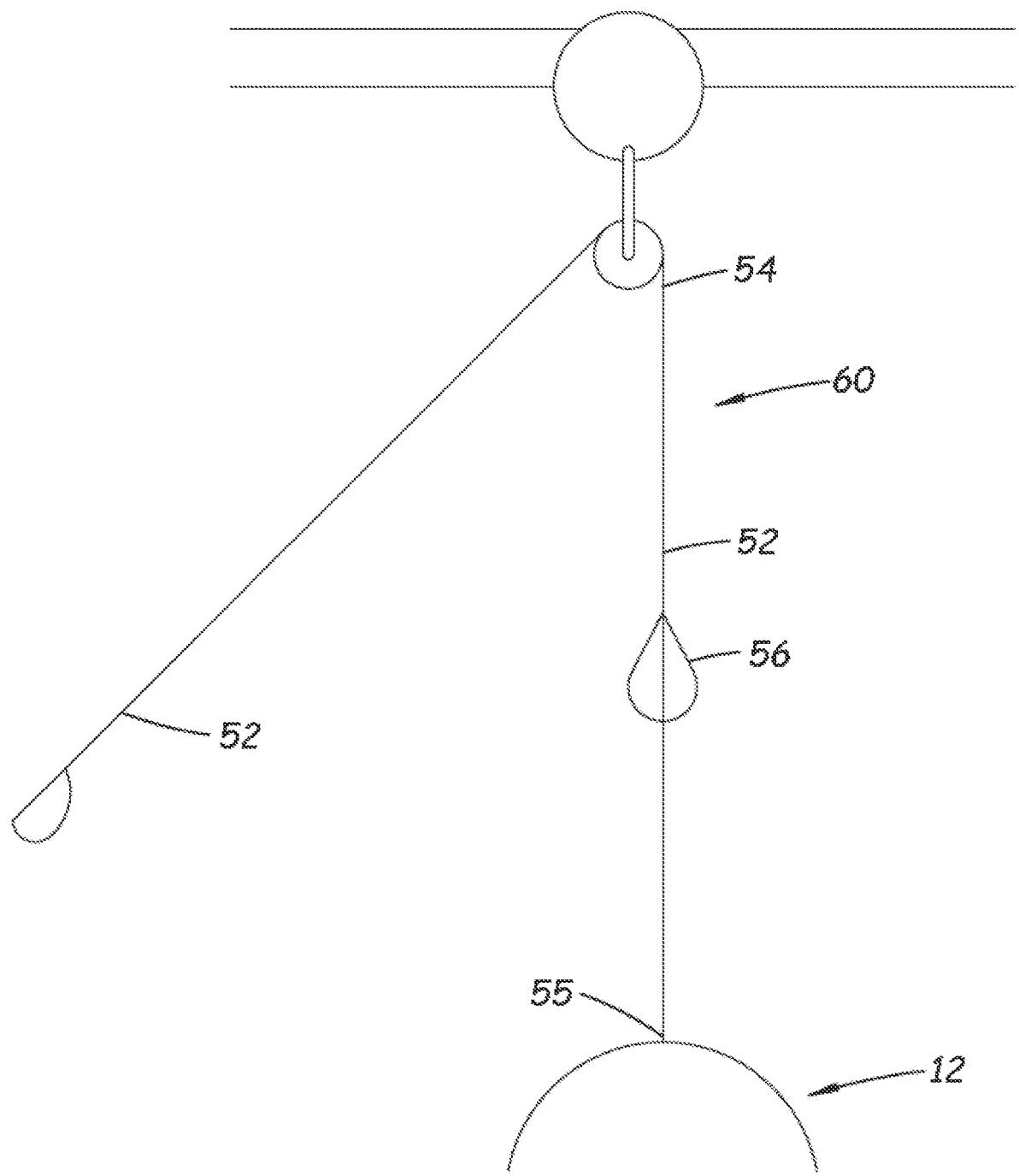
FIG. 6 is a schematic side view of the suspending structure of the bird feeder apparatus, according to an illustrative embodiment.
Figure 7:
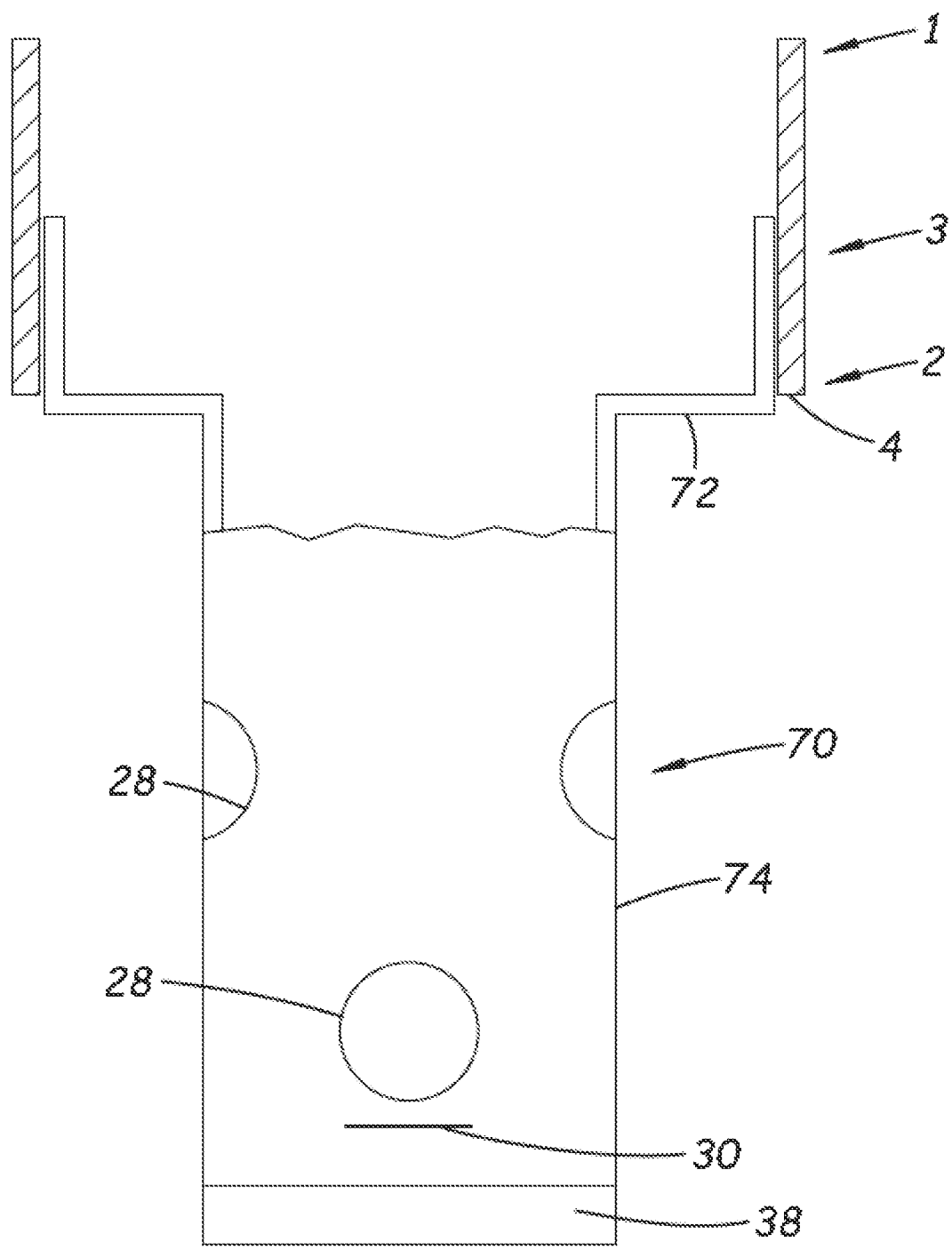
FIG. 7 is a schematic side view of a feeder bottom end, according to an illustrative embodiment.
Figure 8:
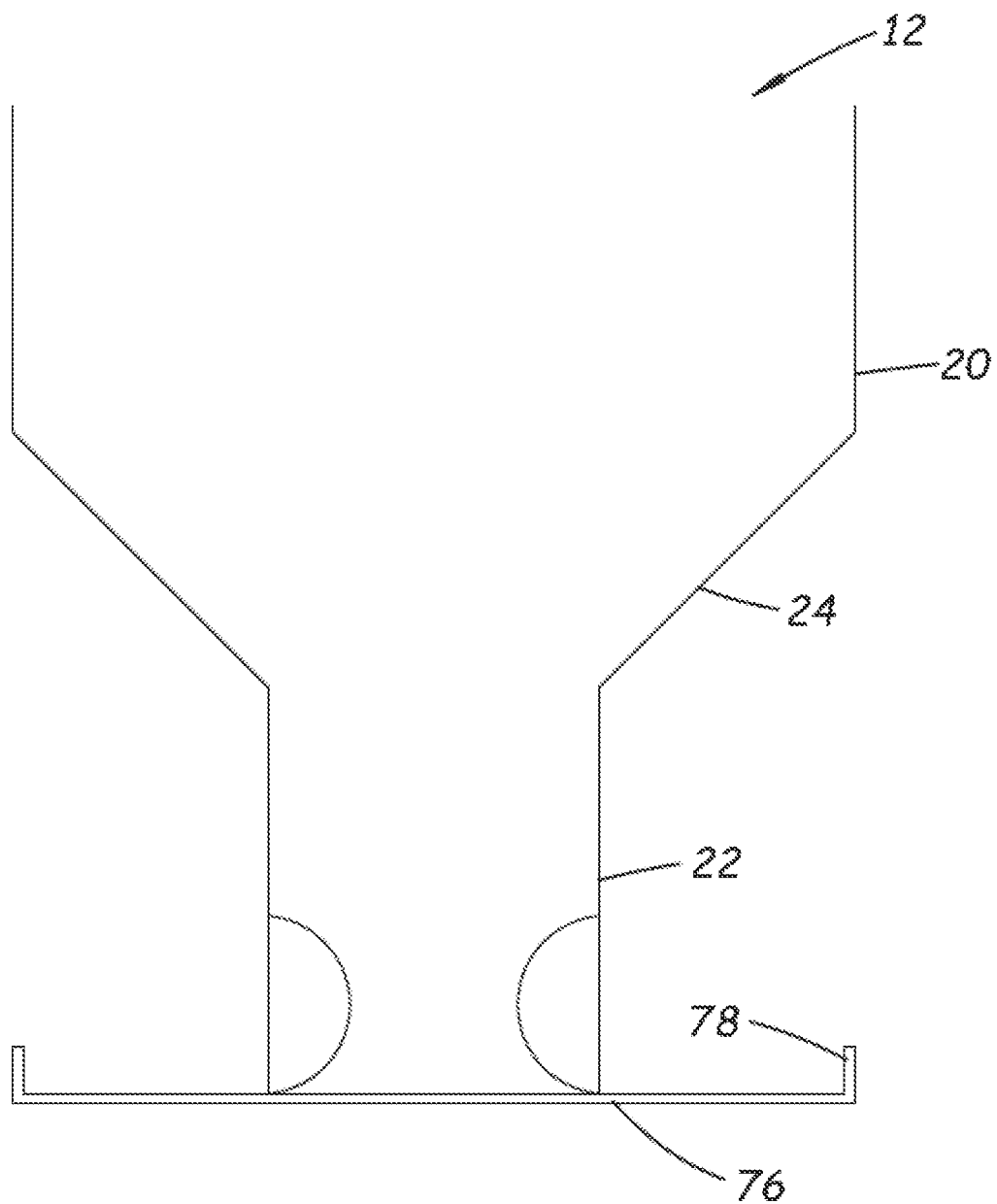
FIG. 8 is a schematic side view of a lower extent of the feed holder with a feed tray, according to an illustrative embodiment.
Figure 9:
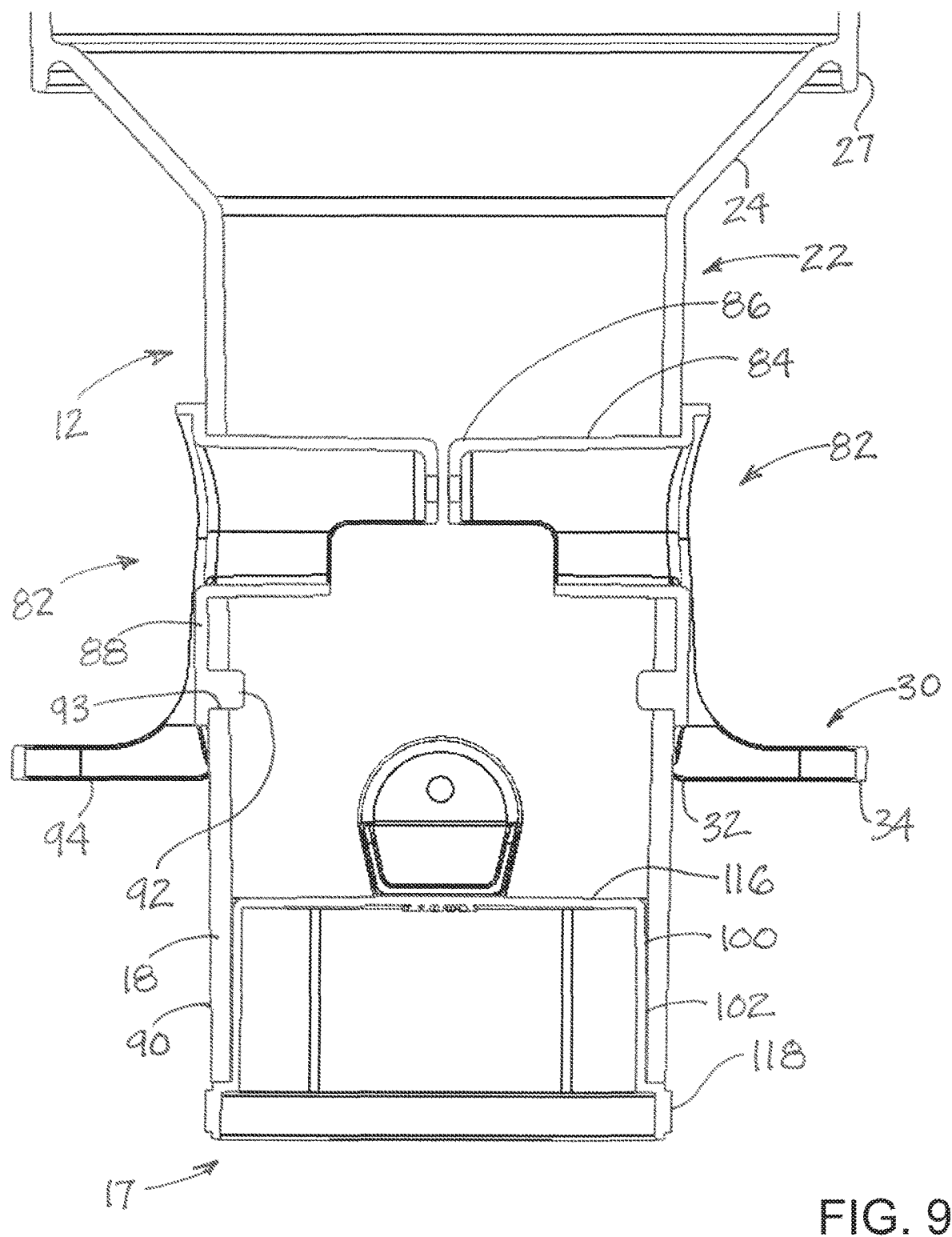
FIG. 9 is a schematic side sectional view of a lower portion of the feed holder showing detail of the perch devices, according to an illustrative embodiment.

In other aspects of the disclosure a feeder cap 60 may be utilized for providing some of the benefits and advantages of the design of the disclosed feed holder to other feed holders as a retrofitted feature (see FIGS. 4 and 5). The feeder cap 60 may be mountable on an upper end of a bird feeder lacking these features as manufactured. The feeder cap 60 may have an outer perimeter 62 with a width, and in some embodiments the outer perimeter may have a circular shape and the width may comprise a diameter. The width of the outer perimeter 62 may be substantially equal to, or preferably larger than, the width of the bird feeder, such as the feed holder element of the bird feeder. The feeder cap 60 may have an upper surface 64, and the upper surface may have a dome shape, or in inverted cone or conical shape, or even a flat shape which lacks a protruding edge that may provide a paw-hold for squirrel. The feeder cap 60 may include a top wall 66 which has the outer perimeter as well as the upper surface 64, and a perimeter wall 68 which may extend generally downwardly from the outer perimeter of the top wall (see FIG. 4). The feeder cap may be mounted on the top of the feeder in any suitable manner, such as by mechanical fastening or bonding by an adhesive or adhesive structure.

In other optional embodiments, a feeder bottom end 70 (see FIG. 7) may be provided for mounting on the lower end of a tubular structure 1. The feeder bottom end 70 may include an upper transition portion 72 for mounting to a lower section 3 of the tubular structure located at a lower opening for of the tubular structure to thereby close the lower opening. The upper transition portion 72 may have a width which is substantially equal to the width of the lower end 2 of the tubular structure. The feeder bottom end 70 may also include a lower portion 74 located below the upper transition portion 72. The lower portion 74 may have a width that is less than the upper transition portion 72, and may also have at least one feed opening at least one perch being provided on the lower portion adjacent to the feed opening.

The feed openings, and the associated perches, are formed on the lower portion and for the most part are tucked underneath the larger upper portion so that a squirrel sliding down or falling along the outer surface of the upper portion may slide right past the perches since the perches do not protrude significantly with respect to the outer surface of the upper portion.

In some embodiments, a feed tray 76 may be located toward the lower end 17 of the feed holder, such as at the lower end, and may be attached to the lower end. The feed tray 76 may have a generally upstanding perimeter lip 78 for helping to keep feed (e.g., seeds) on the feed tray until consumed by a bird. The feed tray 76 may extend outwardly from the lower portion 22 of the feed holder, and more specifically may extend outwardly in at least two opposite directions from the lower portion. The feed tray 76 may have an extent measured in the opposite directions. In some embodiments, the extent may be configured such that, or characterized by the fact that, all, or substantially all, of the extent of the tray does not extend, or does not extend to an appreciable degree, beyond the vertical plane of the perimeter wall of the upper portion 20 of the perimeter wall 18 of the feed holder. The perimeter shape of the tray 76 may be of any suitable shape, and may correspond to the shape of the horizontal cross section of the perimeter wall of the feed holder.

In some embodiments, the perch 30 may comprise a perch device 82 which is configured to be at least partially inserted into one of the feed openings 28 of the feed holder 12 and provide a perch or rest for a bird accessing feed through the feed opening. The perch device may include a feed diverter portion 84 which is insertable through the feed opening 28 into the interior 14 of the feed holder. The feed diverter portion 84 may have an interior and 86 which may be fully inserted into the interior and may be configured to abut against the interior and of a feed diverter portion of a second perch device inserted through a second feed opening located on an opposite side of the perimeter wall 18 from the first feed opening. The interior ends of the feed diverter portions of the devices may be abuttable and connectable together using a suitable fastener which thereby holds the perch device is in position on the perimeter wall. Each perch device may also include a wall abutment portion 88 which is configured to abut against an outer surface 90 of the perimeter wall of the feed holder when the feed diverter portion 84 is inserted through the feed opening. The wall abutment portion 88 may be configured to frame or otherwise surround the feed opening in the perimeter wall. The wall abutment portion 88 may include an engagement peg 92 which is configured to insert through a positioning hole 93 when the feed diverter portion is inserted through the feed opening. The perch device 82 may also include a perch portion 94 which extends outwardly from the wall abutment portion 88 four extending outwardly from the perimeter wall of the feed holder when the feed diverter portion is inserted through the feed opening.

Figure 10:
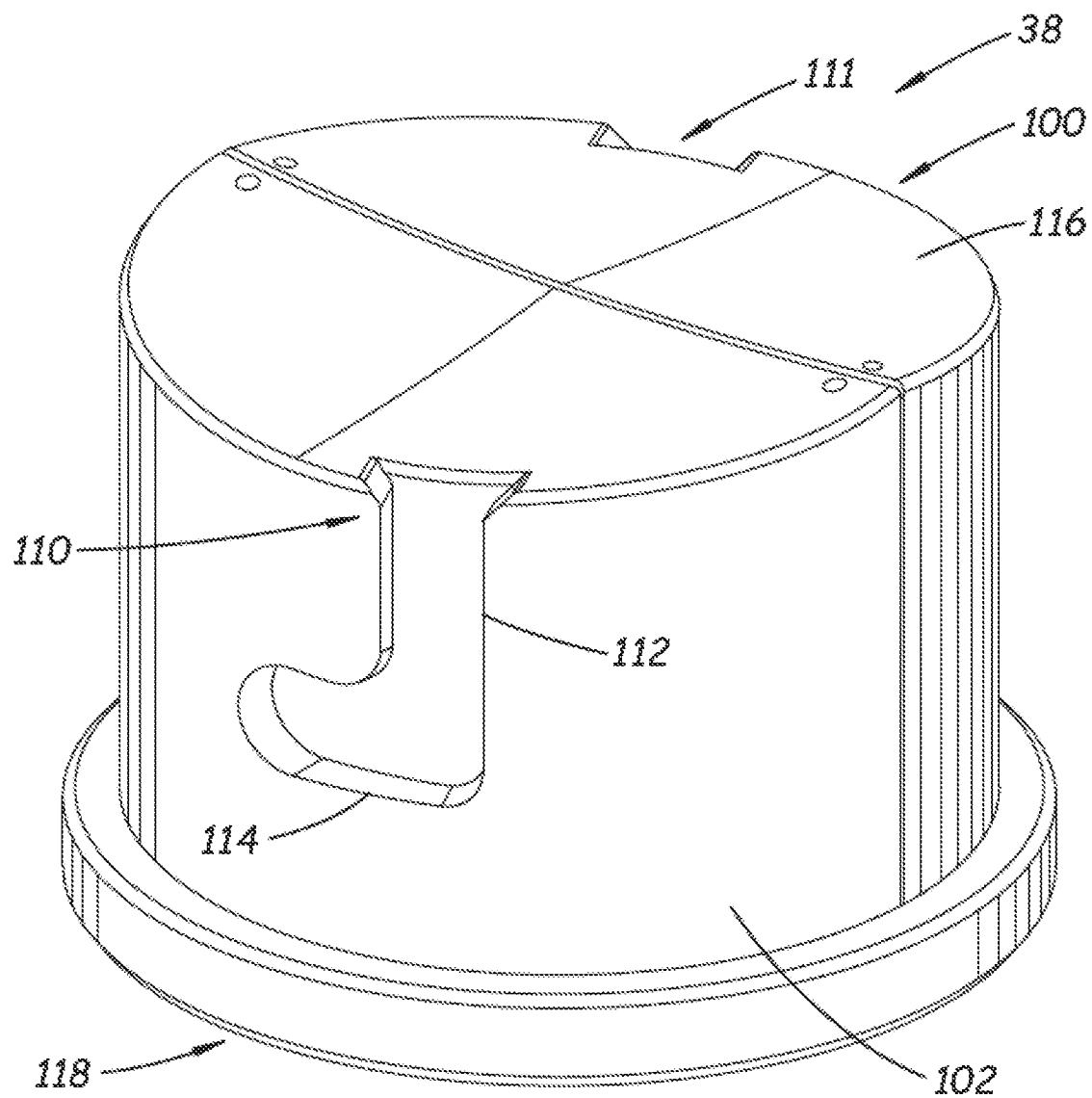
FIG. 10 is a schematic perspective view of a lower fill cap for the feed holder, according to an illustrative embodiment.
Figure 11:
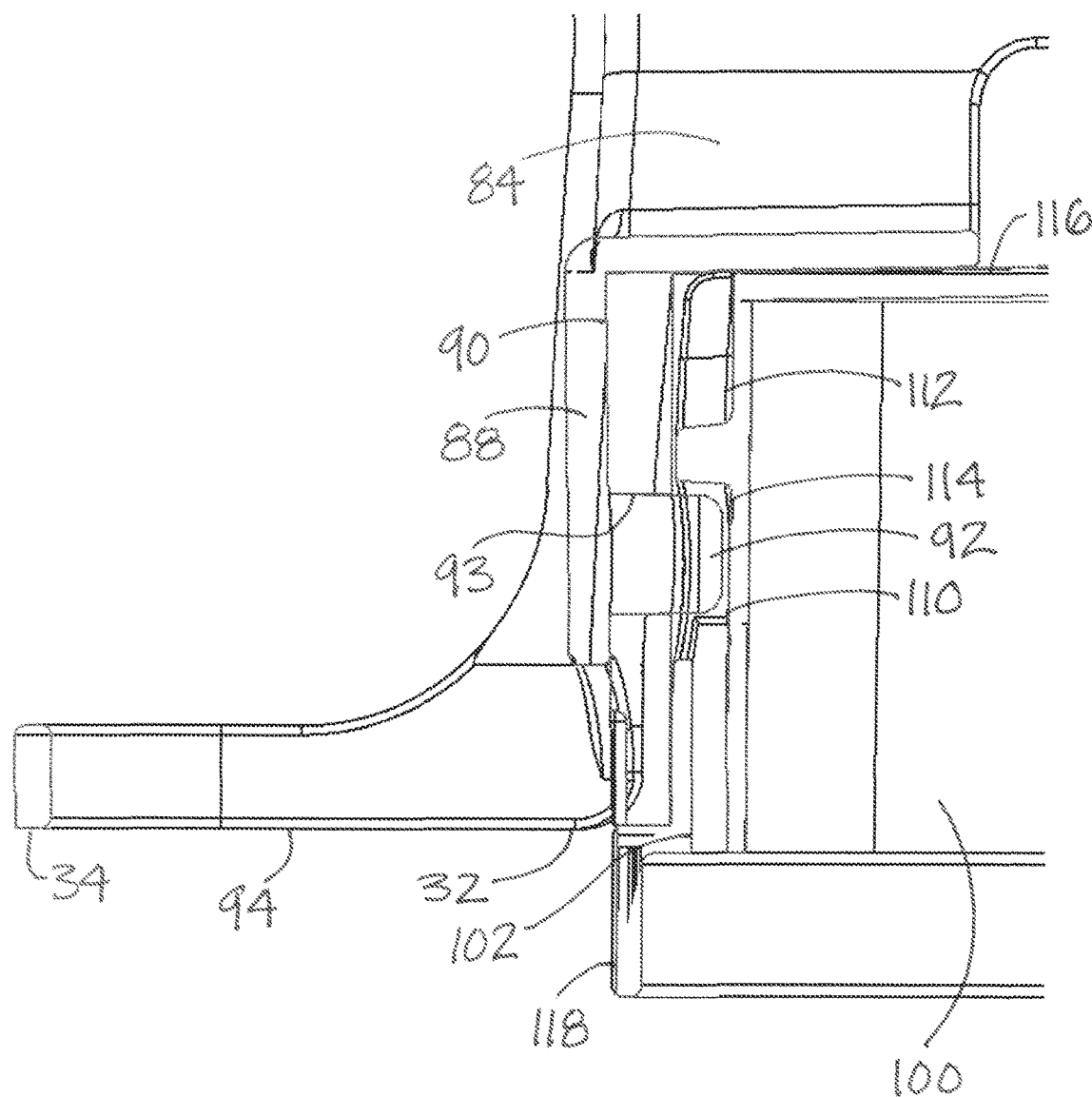
FIG. 11 is a partial sectional view of the lower fill cap, the lower portion of the perimeter wall, and the perch device of the feed holder, according to an illustrative embodiment.

In some embodiments, the lower fill cap such as is shown in FIGS. 10 and 11, may include an insert portion 100 which is configured to insert into the interior 14 of the feed holder through the lower fill opening 36 of the feed holder. The insert portion 100 may have an outer surface 102 four being positioned adjacent to the perimeter wall when the insert portion is inserted into the interior. A locking slot 110 may be configured to receive a portion of the engagement peg 92 of the wall abutment portion 88 of the perch device which extends through the positioning hole 93 in the perimeter wall when the perch is mounted on the feed holder. The locking slot 110 may be formed in the outer surface of the insert portion, and may have an entry portion 112 and a locking portion 114 with the locking portion being oriented substantially perpendicular to the entry portion. The entry portion 112 may be in communication with a top and 116 of the insert portion. In some embodiments, a pair of the locking slots 110, 111 may be formed in the outer surface, and may be located on substantially opposite sides of the insert portion. During mounting of the lower fill cap on the perimeter wall, the insert portion 100 may be inserted through the lower fill opening and may be rotated to align the engagement peg or pegs 92 of the perch device or devices with the entry portion 112 of the locking slot. The insert portion may be can continue to be moved into the interior until the engagement peg reaches the end of the entry portion, whereupon rotation of the lower fill cap tends to move the engagement peg 92 into the locking portion 114 of the slot to thereby secure the lower fill cap on the perimeter wall in the condition that closes the lower fill opening 36. The lower fill cap may be removed by rotating the cap such that the engagement peg moves through the locking portion to reach the entry portion, whereupon the insert portion may be withdrawn from the interior by a generally linear movement of the portion 100 with respect to the perimeter wall.

In some embodiments, the lower fill cap may also include a lip portion 120 which extends radially outwardly from some or all of the circumference of the insert portion such that the lid portion 120 abuts against a lower edge of the perimeter wall to thereby limit the degree of insertion of the insert portion into the interior of the feed holder.

Figure 12:
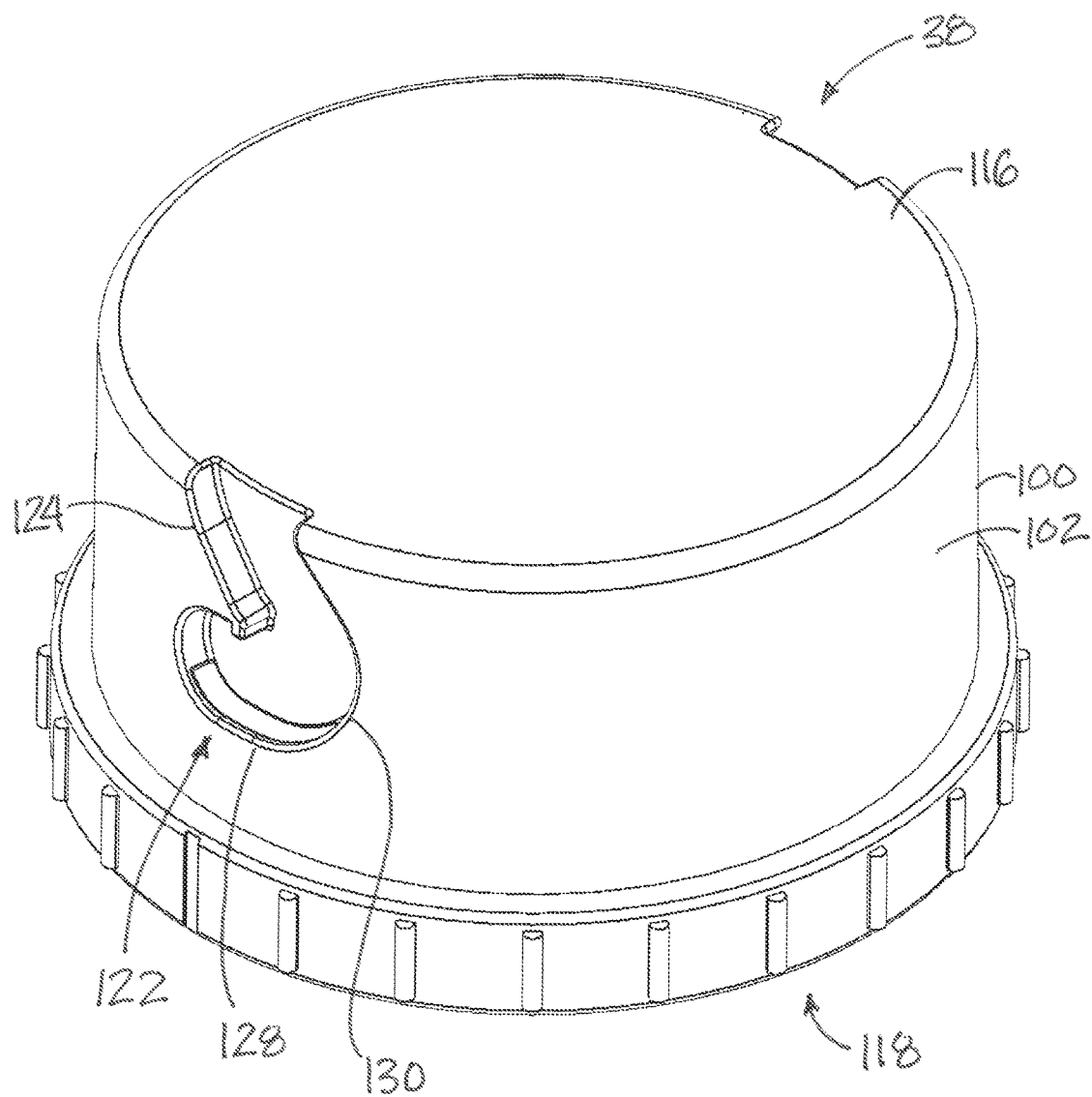
FIG. 12 is a schematic perspective view of a lower fill cap for the feed holder with an optional configuration for the locking slot, according to an illustrative embodiment.
Figure 13:
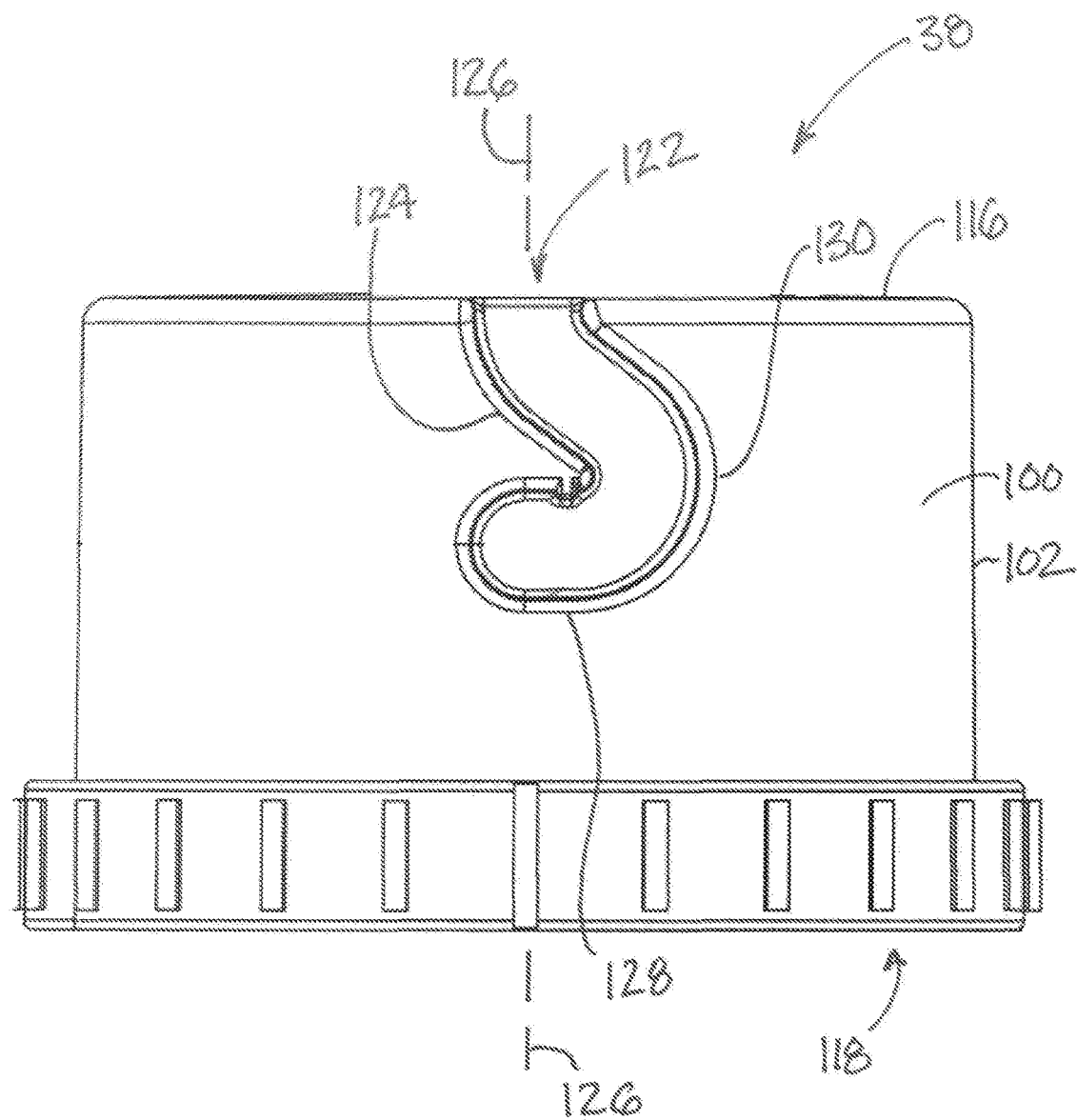
FIG. 13 is a schematic side view of the lower fill cap of FIG. 12 with the optional configuration for the locking slot, according to an illustrative embodiment.

In some further embodiments, such as are shown in FIGS. 12 and 13 of the drawings, a convoluted locking slot 122 positioned on the opposite locations on the lower fill cap may have a configuration that has a path for the engagement peg to move as the lower fill cap is mounted on the perimeter wall of the feed holder. In greater detail, the slot 122 may have a configuration that requires an initial rotation of the lower fill cap in a first rotational direction and then a subsequent rotation of the fill cap in a second opposite rotational direction in a substantially opposite direction to the first rotational direction. Illustratively, the convoluted slot 122 may include an entry portion 124 which extends at an oblique angle with respect to the plane defined by the top of the lower fill cap to require rotation of the fill cap about a rotation axis 126 as the lower fill cap is moved axially along the rotation axis in order to advance the lower fill cap into the interior 14 of the feed holder. At a media point along the path, further insertion of the lower fill cap into the feed holder interior requires reversal of the direction of rotation about the rotation axis to move the engagement peg into the locking portion 128 of the locking slot which may be oriented substantially parallel to the plane defined by the top of the lower fill cap. A transition portion 130 of the slot may be arcuate in shape such that the convoluted locking slot has a serpentine shape.

Figure 14:
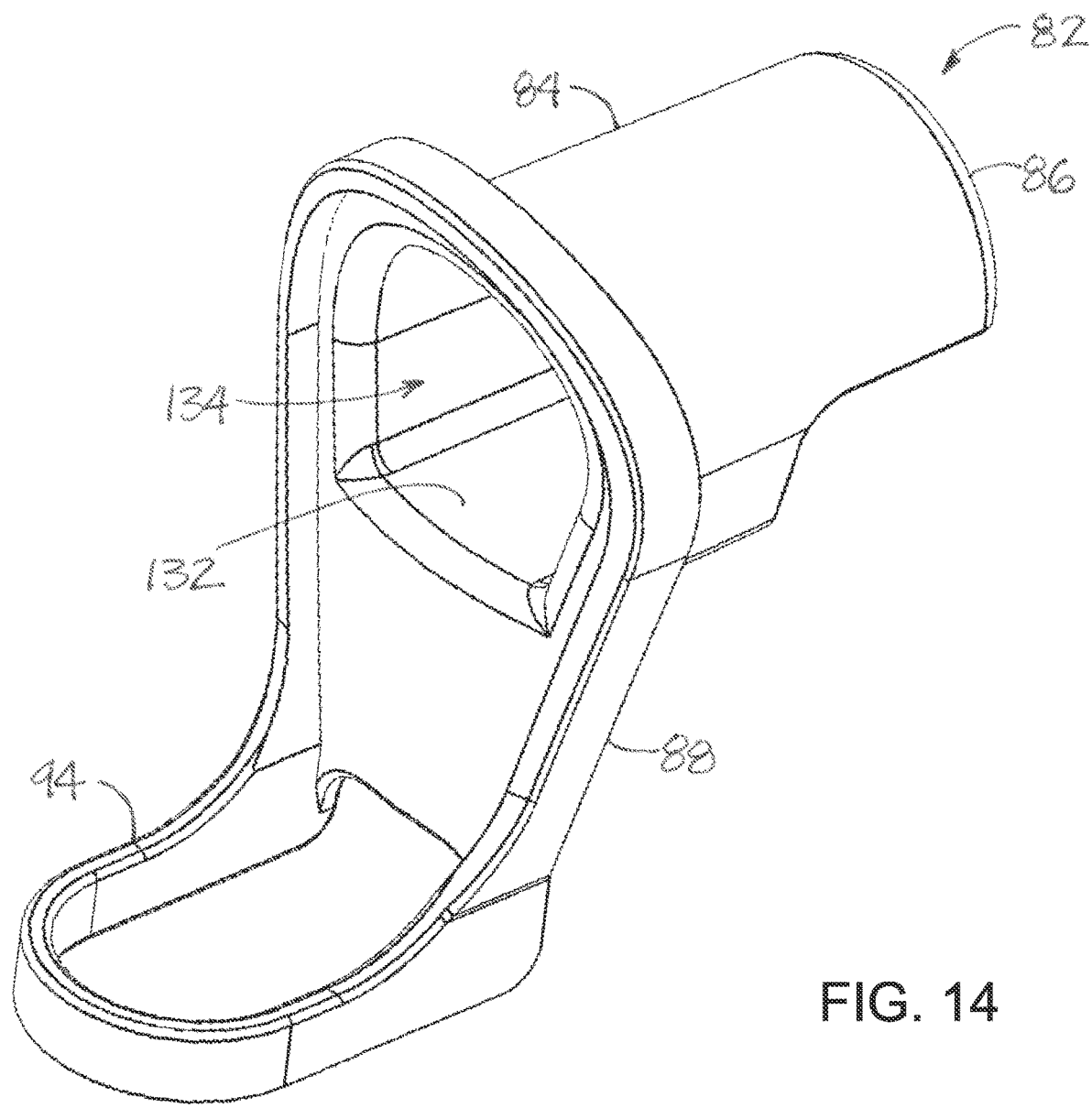
FIG. 14 is a schematic perspective view of a perch device for the feed holder with an optional configuration, according to an illustrative embodiment.
Figure 15:
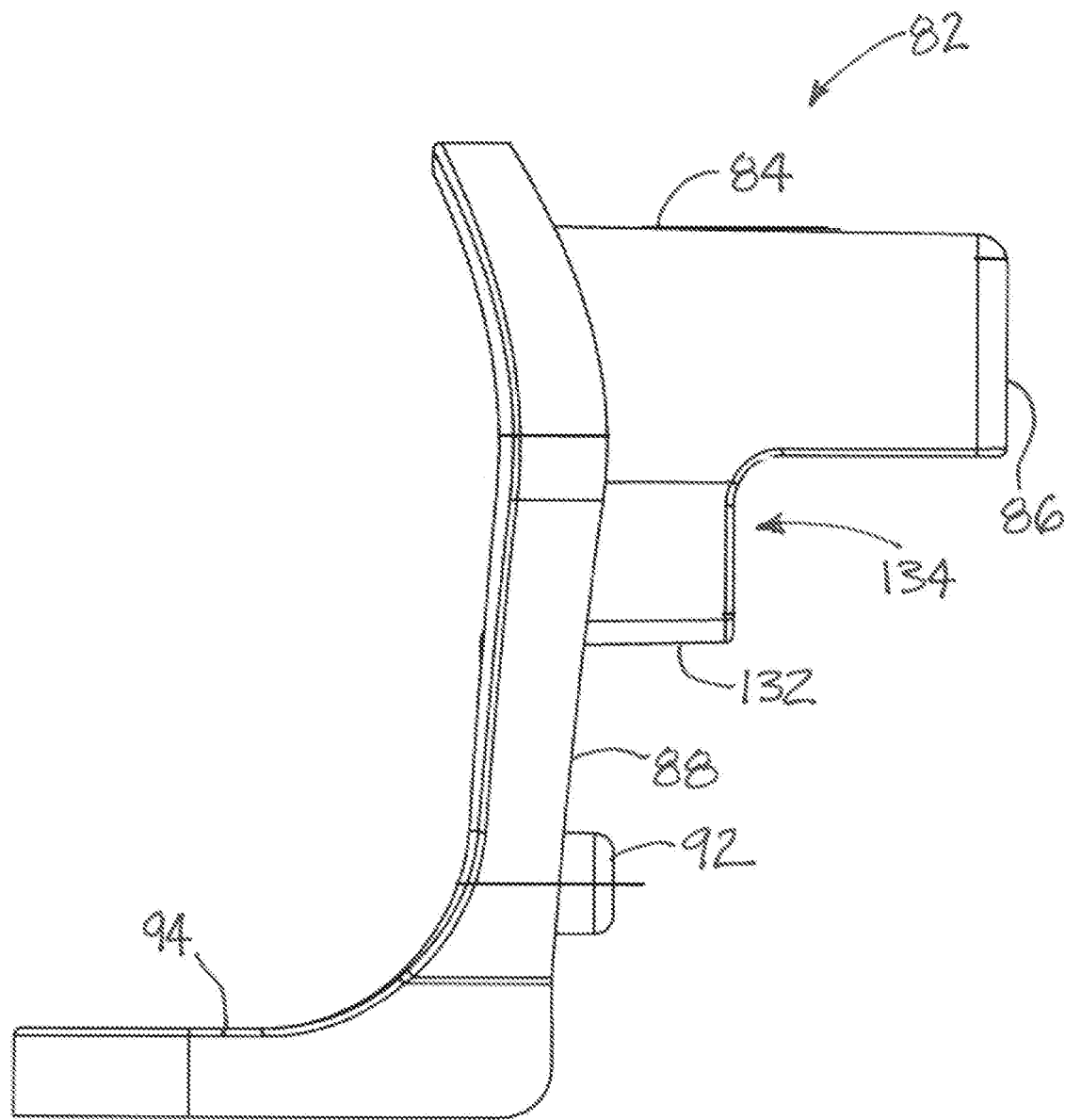
FIG. 15 is a schematic side view of the perch device of FIG. 14, according to an illustrative embodiment.
Figure 16:
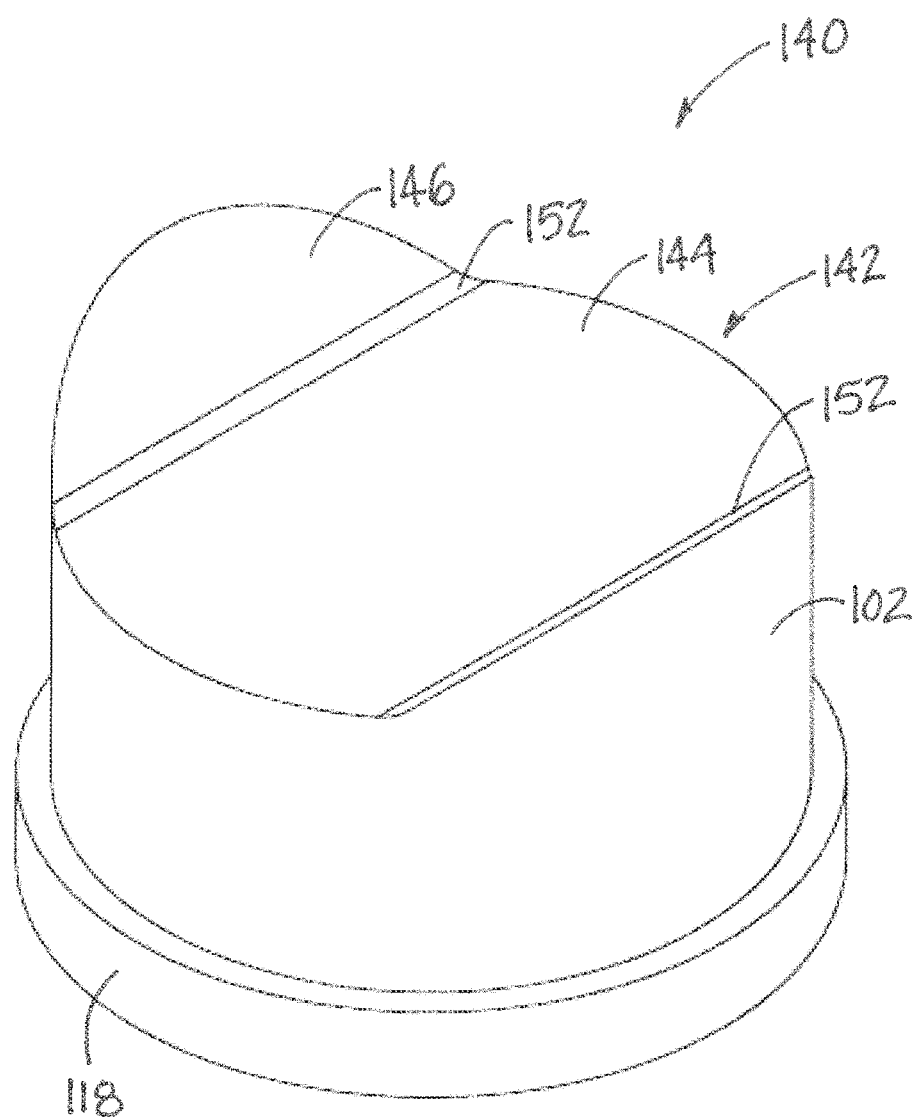
FIG. 16 is a schematic perspective view of an optional embodiment of the lower fill cap of the feed holder, according to an illustrative embodiment.
Figure 17:
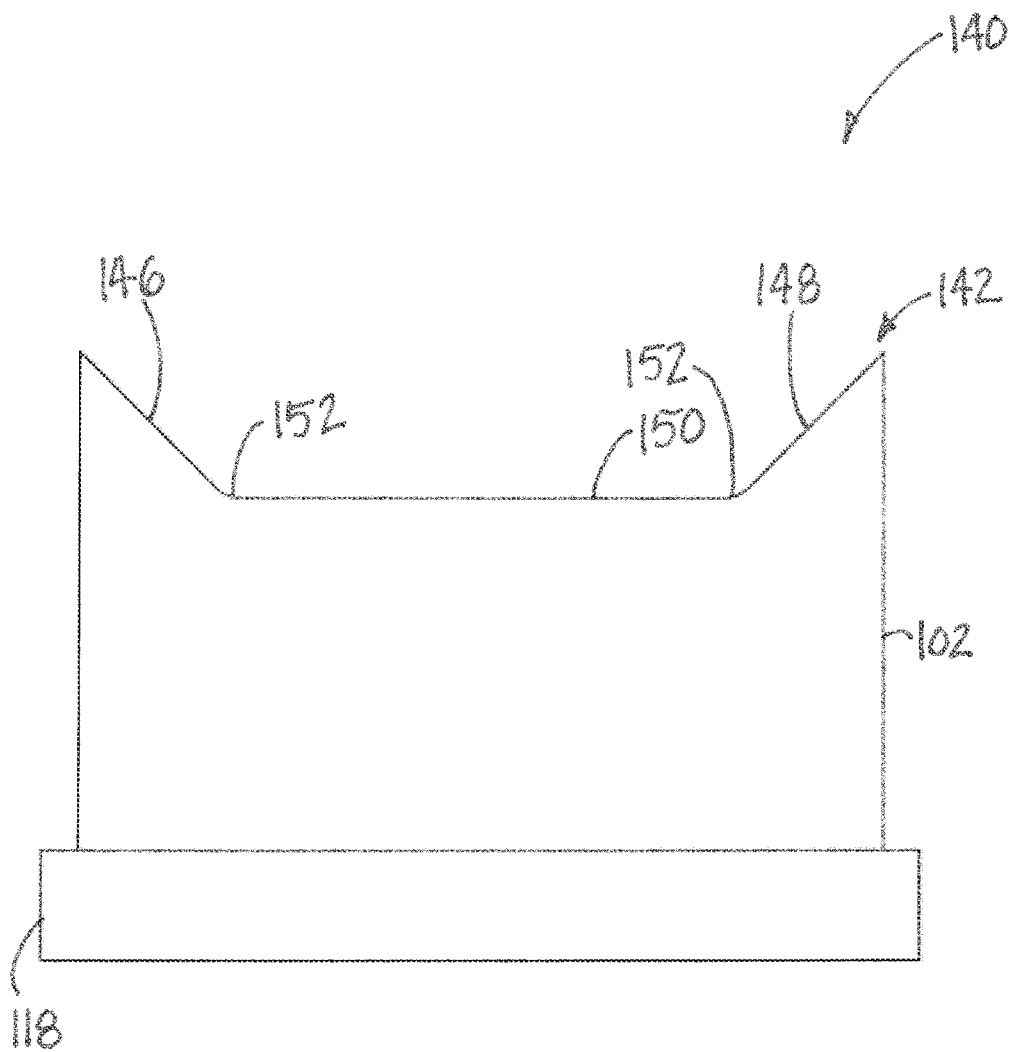
FIG. 17 is a schematic first side view of the optional embodiment of the lower fill cap of the feed holder shown in FIG. 15, according to an illustrative embodiment.
Figure 18:
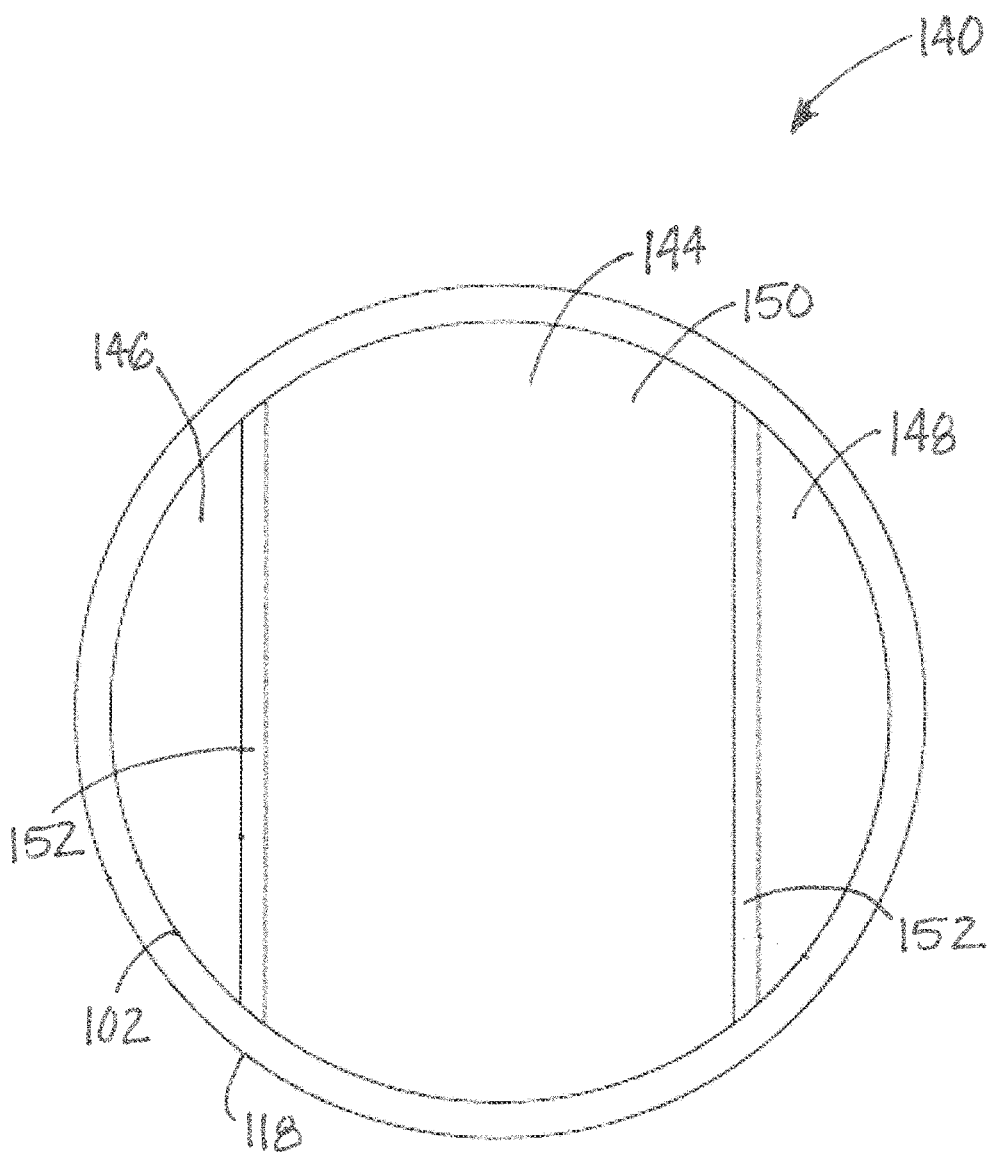
FIG. 18 is a schematic top view of the optional embodiment of the lower fill cap of the feed holder shown in FIG. 15, according to an illustrative embodiment.
Figure 19:
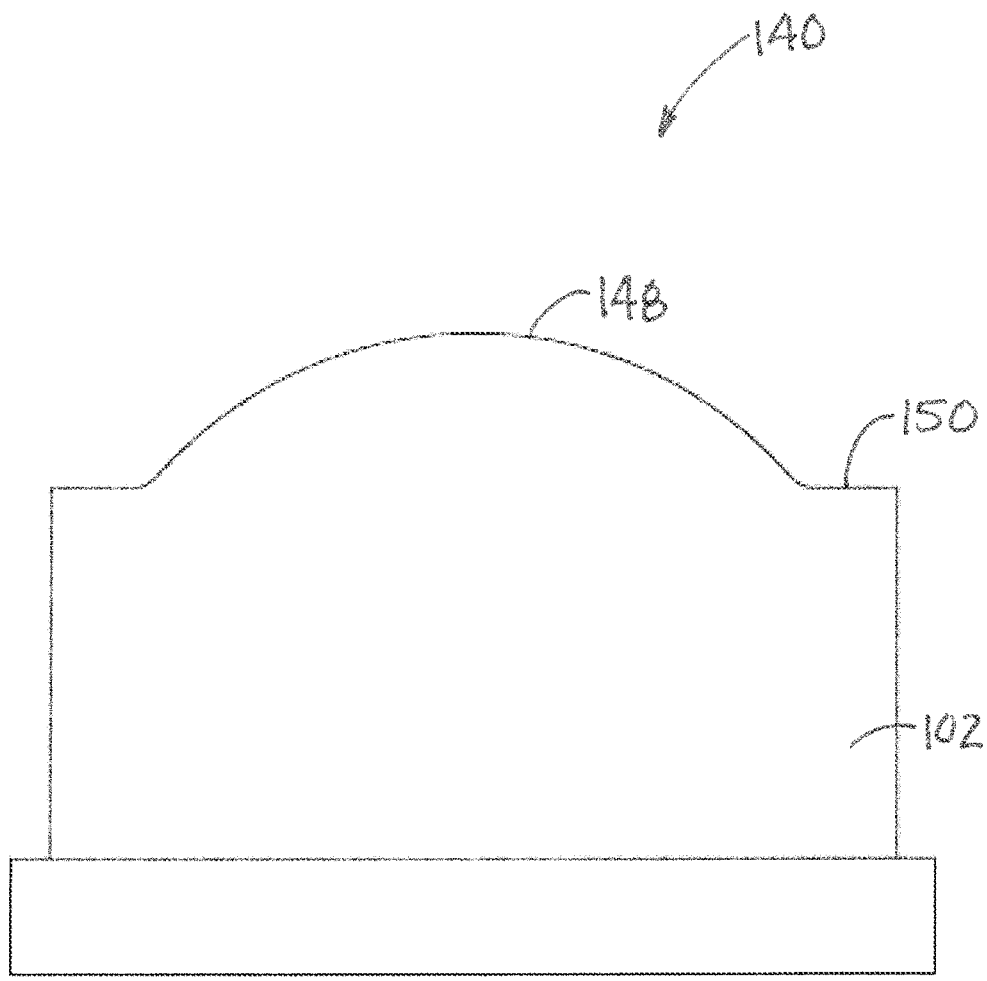
FIG. 19 is a schematic second side view of the optional embodiment of the lower fill cap of the feed holder shown in FIG. 15, according to an illustrative embodiment.

In still other embodiments, such as are shown in FIGS. 14 and 15 of the drawings, the feed diverter portion of a perch device may include a lower shield wall 132 provided to help shield the locking slot of the lower fill cap from seed within the interior of the feed holder moving into the locking slot and potentially inhibiting movement of the engagement peg in the slot and removal of the lower fill cap from the perimeter wall. The perch device is configured to position the lower shield wall 132 adjacent above the entry into the slot when the perch device is mounted on the perimeter wall and the lower fill cap is inserted into the interior of the perimeter wall with the engagement peg positioned in the locking portion of the locking slot. The lower shield wall 132 extends from the wall abutment portion of the perch device in substantially the same direction as the engagement peg for a distance that is generally sufficient to deter seed from entering the locking slot. The lower shield wall 132 may form a partial throat 134 on the feed diverter portion of the perch device is positioned into which the feeding bird may insert its beak or other mouthparts to reach the feed in the interior of the feed holder.

In another embodiment, such as is shown in FIGS. 16 through 19 of the drawings, a lower fill cap 140 has a top end 142 with a top surface 144 that is contoured in a manner that facilitates the flow of the feed toward the opening or openings 28 in the perimeter wall 18 of the feeder. In greater detail, the top surface 144 of the lower fill cap may be contoured with a plurality of surface regions. The plurality of surface regions may include at least one side surface region, and illustratively includes a pair of side surface regions 146, 148. The pair of side surface regions may be positioned adjacent to opposite locations on the outer surface 102 of the insert portion 100 of the lower fill cap 140. The pair of side surface regions 146, 148 may extend downwardly and inwardly toward each other from the opposite locations on the outer surface 102, and may be separated from each other. The plurality of surface regions may also include a central surface region 150 which may be positioned between the side surface regions 146, 148. In some embodiments, the central surface region 150 may be wider than each of the side surface regions 146, 148 measured in a direction substantially perpendicular to the length of the central surface region.

Illustratively, the central surface region 150 may have a width which is greater than the combined widths of the pair of side surface regions 146, 148. The central surface region 150 may be depressed with respect to the side surface regions 146, 148, and the side surface regions may extend downwardly and inwardly toward the central surface region such that feed resting upon or in contact with the side: surface regions tend to move toward the central surface region under the influence of gravity. A boundary 152 may be positioned between each of the side surface regions and the central surface region. The boundary 152 or boundaries may be linear and substantially straight in character, and the boundaries may be oriented substantially parallel to each other. Each of the boundaries may extend from one location on the outer surface of the insert portion to another location on the outer surface of the insert portion. Each of the side surface regions may extend in an individual plane oriented at an angle with respect to a plane in which the central surface region extends. The angle may be oblique, and may be in the range of approximately 30 degrees to approximately 60 degrees with respect to the horizontal, and illustratively may be approximately 45 degrees. The boundaries 152 may form a transition between the planar faces of the central and side surface regions, approximating a partial fold in the top surface. Each of the side surface regions 146, 148 may have a substantially semicircular shape.

Figure 20A:
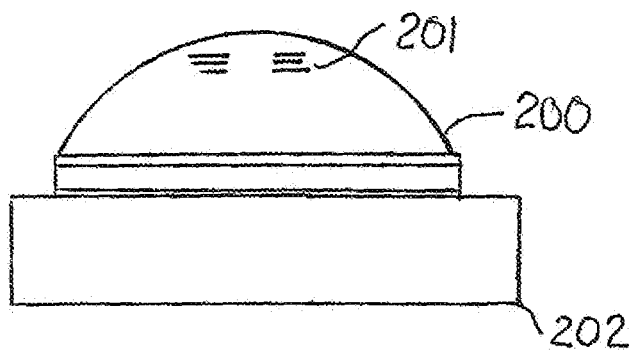
FIG. 20A shows a cap for the bird feeder.

FIG. 20A shows a cap 200 for the bird feeder, with a protective and attaching ring 202 attached.

Figure 20B:
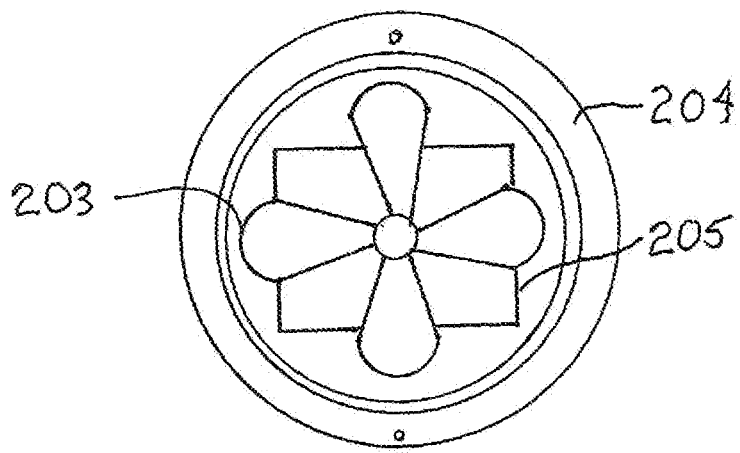
FIG. 20B shows a connecting ring for the cap to a main section of the bird feeder.

FIG. 20B shows a bottom view of the connecting ring 204 for the cap to a main section of the bird feeder.

Figure 20C:
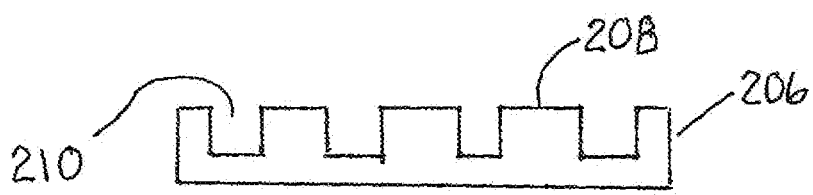
FIG. 20C shows an interior spacing and air-movement enabling support ring that may be attached to the bottom of the cap, teeth up.

FIG. 20C shows an interior spacing and air-movement enabling support ring 206 that may be attached to the bottom of the cap, with its teeth 208 and its open area 210 up.

Figure 20D:
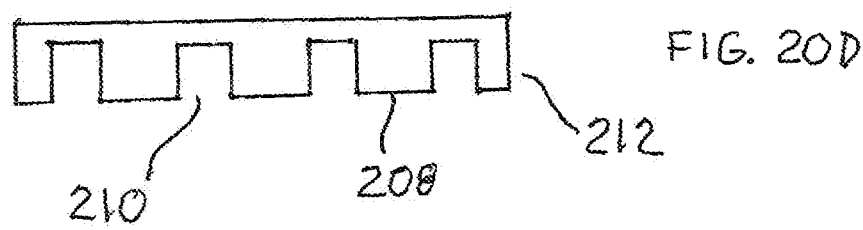
FIG. 20D shows an interior spacing and air-movement enabling support ring that may be attached to the bottom of the cap, teeth down. A similar ring (including 20C) may be positioned on the bottom of the feeder to assist in air flow to maintain a dry or less moist interior of the feeder.

FIG. 20D shows an interior spacing and air-movement enabling support ring that may be attached to the bottom of the cap, with its teeth 208 and is air flow openings 210 facing down. A similar ring (including 200 of FIG. 20C) may be positioned on the bottom of the feeder to assist in air flow to maintain a dry or less moist interior of the feeder.

The air-movement support ring 206 offers improved resistance to moisture buildup and moisture-caused clogging, and feed deterioration or spoilage (mildew, mold, bacteria build-up, etc.) of the feed within the device. Typically, moisture build-up persists, even when feed is changed, because of agglomeration of sed in sections of the feed holder, and fungus and bacterial buildup may be left behind or accelerated in new feed lots if the feeder is not thoroughly cleaned and scrubbed. This is seldom done with feeders, as they are kept outdoors and typically refilled outdoors. It has often been inconvenient to thoroughly scrub the feed storage section.

Most feeders have a cap that is intended to keep moisture out, attempting to limit sources of moisture to the feed storage. This, however, restricts air-slow through the system, allowing moisture that has entered the feed storage area to persist.

The present invention provides the air-movement support ring 206 under and within a volume less than the radius and profile vertical surface area of the cap 200. The cap covers the openings/open areas 210 in the support ring 206. The prevention of moisture/water entry through the top of the feeder, while allowing air flow to help eliminate any ambient moisture that has enter the feeder, as at the bottom of the feeder where openings must be present to enable birds to teach the feed at the bottom or mid-levels of the feeder. There must of course be holes available for bird access to food, and most often water (from rain, sprinklers, etc.) gains access to the feed through these openings. However, previous feed systems had such poorly designed chemical engineering structures that there would always be an opportunity for moisture buildup, without any consideration of moisture mediation or removal. The present system does this.

By having the open areas 206 above the level of the feed (initially or as the feed depletes and its top level drops), natural air flow is allowed and occurs within the feed storage area. Whether ambient breezes or ambient mass flow dynamics are in action, air moves through the system, picking up moisture from the feed, and bringing or moving the moisture content of the seed into equilibrium with the atmosphere. This will greatly reduce the tendency of feed spoiling from excess moisture being present. Air may flow up or down in the feeder, as natural effects dictate.

It is also possible to add fans outside or inside the feeder (e.g., solar driven or battery driven, automatic of remote control, etc.) to assure better movement. Small motors with fans above the feed levels, either drawing or driving air flow would work. The fans and motors would preferably be attached to the interior side of the cap, although exterior fans would also have some significant effects in driving air flow.

The birdfeeder apparatus further comprising a cap on a top of the birdfeeder apparatus, and an air-movement enabling support ring is associated to an interior surface of the cap; and the air-movement enabling support ring having at least 10% of its surface area open to enable air flow through feed in the birdfeeder apparatus to assist in moderating moisture buildup.

The amount of open area should strike a balance between enabling ambient moisture flow through the feed area of the feeder and providing whatever structural integrity that the air-movement enabling support ring requires. It is likely that a maximum open area percentage would be between 10 and 90%, and preferably be between 15 and 75% open area versus solid surface. This may be impacted by having screens or mesh over the open areas, which could also reduce insect entry into the feed area. An equivalent of the support ring may be placed in the bottom of the feed chamber if desired, but the top placement is critical to obtain through the entire feed chamber air flow.

The ring may extend to 99% of the diameter of the cap, but is preferably about 90-95% of the radius of the filler cap.

Figure 2A:
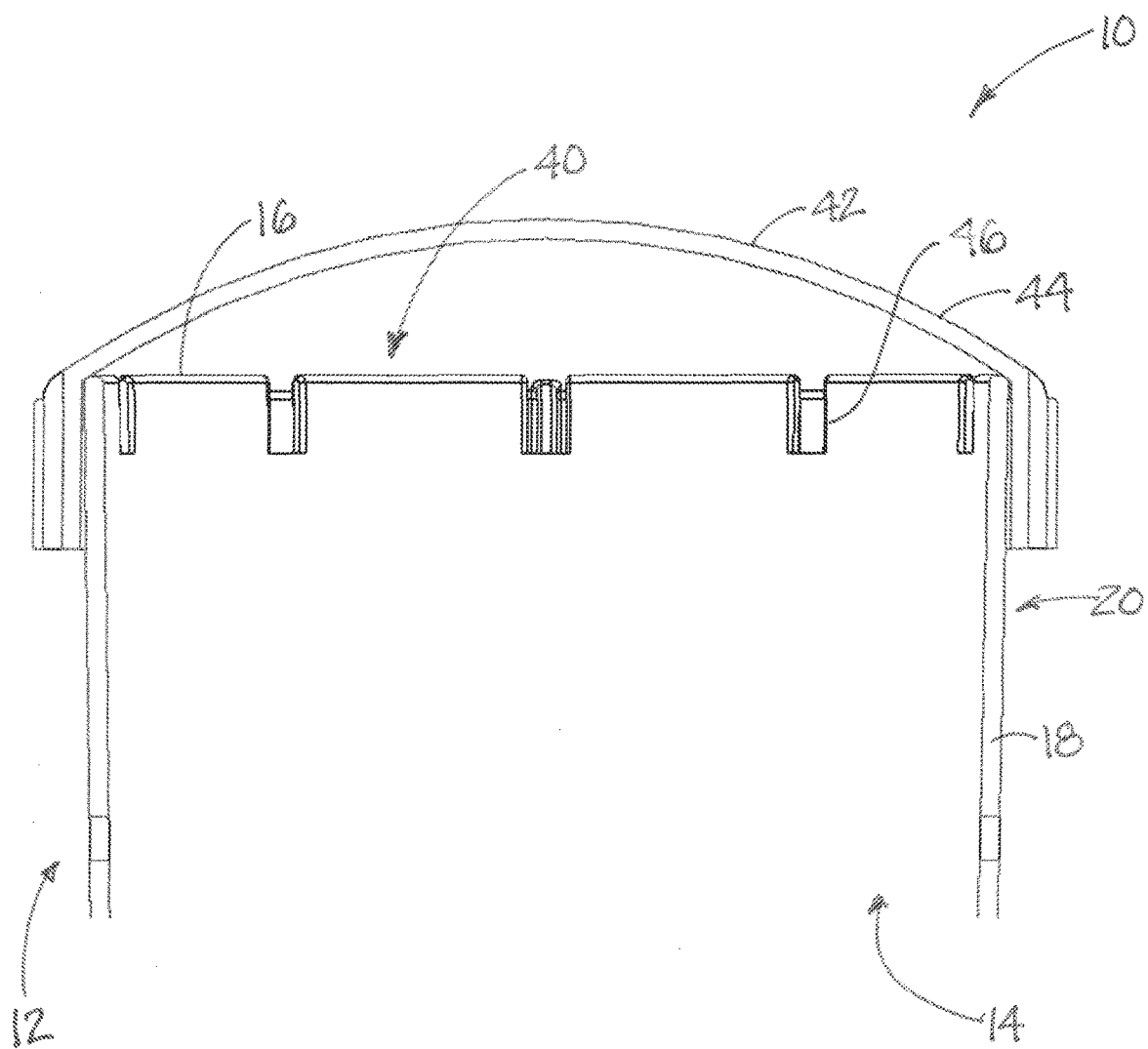
FIG. 2A is a schematic side sectional view of a section of the upper portion with one configuration of the upper surface of the upper portion, according to an illustrative embodiment.
Figure 2B:
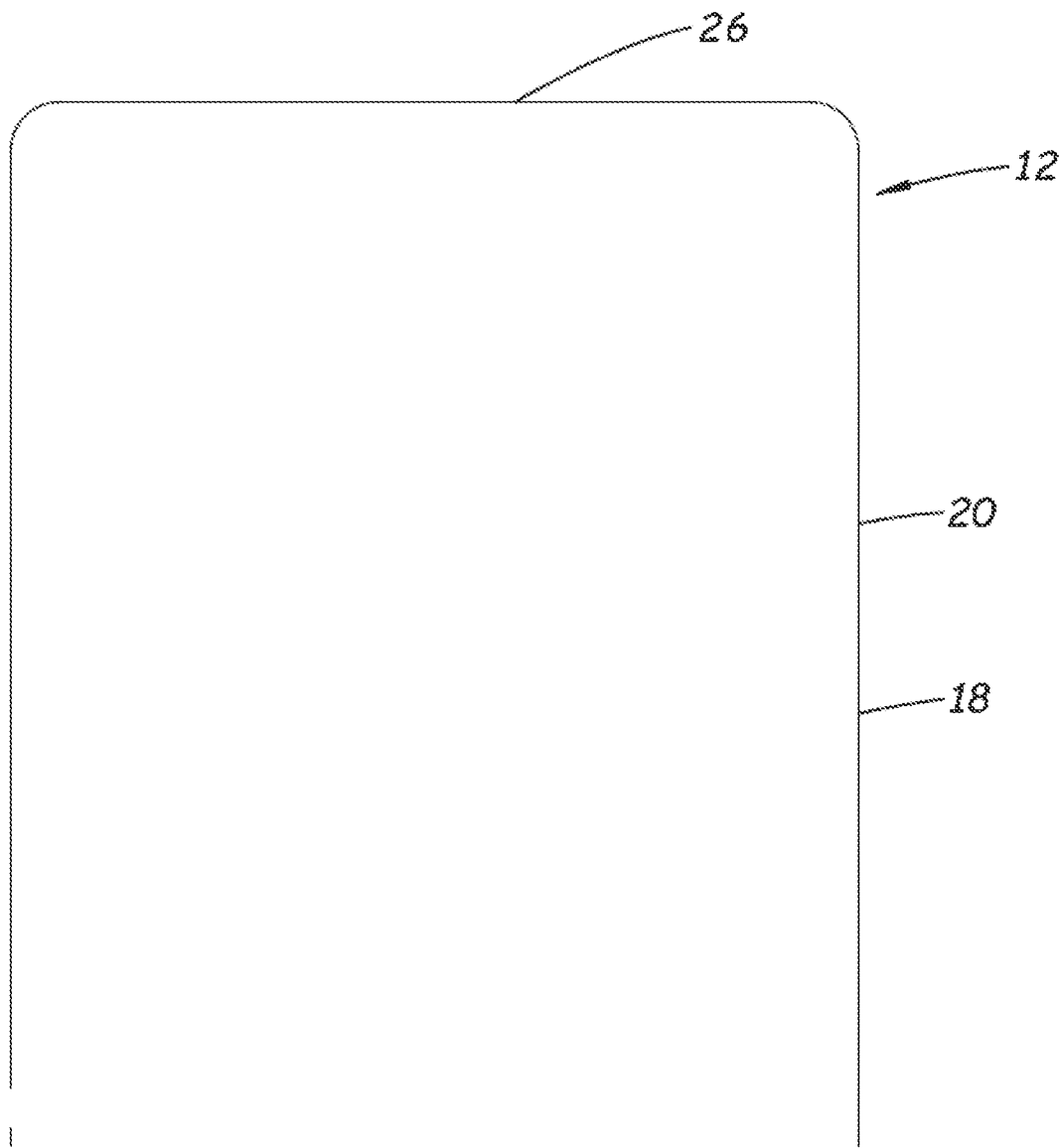
FIG. 2B is a schematic side sectional view of a section of the upper portion with another configuration of the upper surface of the upper portion, according to an illustrative embodiment.
Figure 2C:
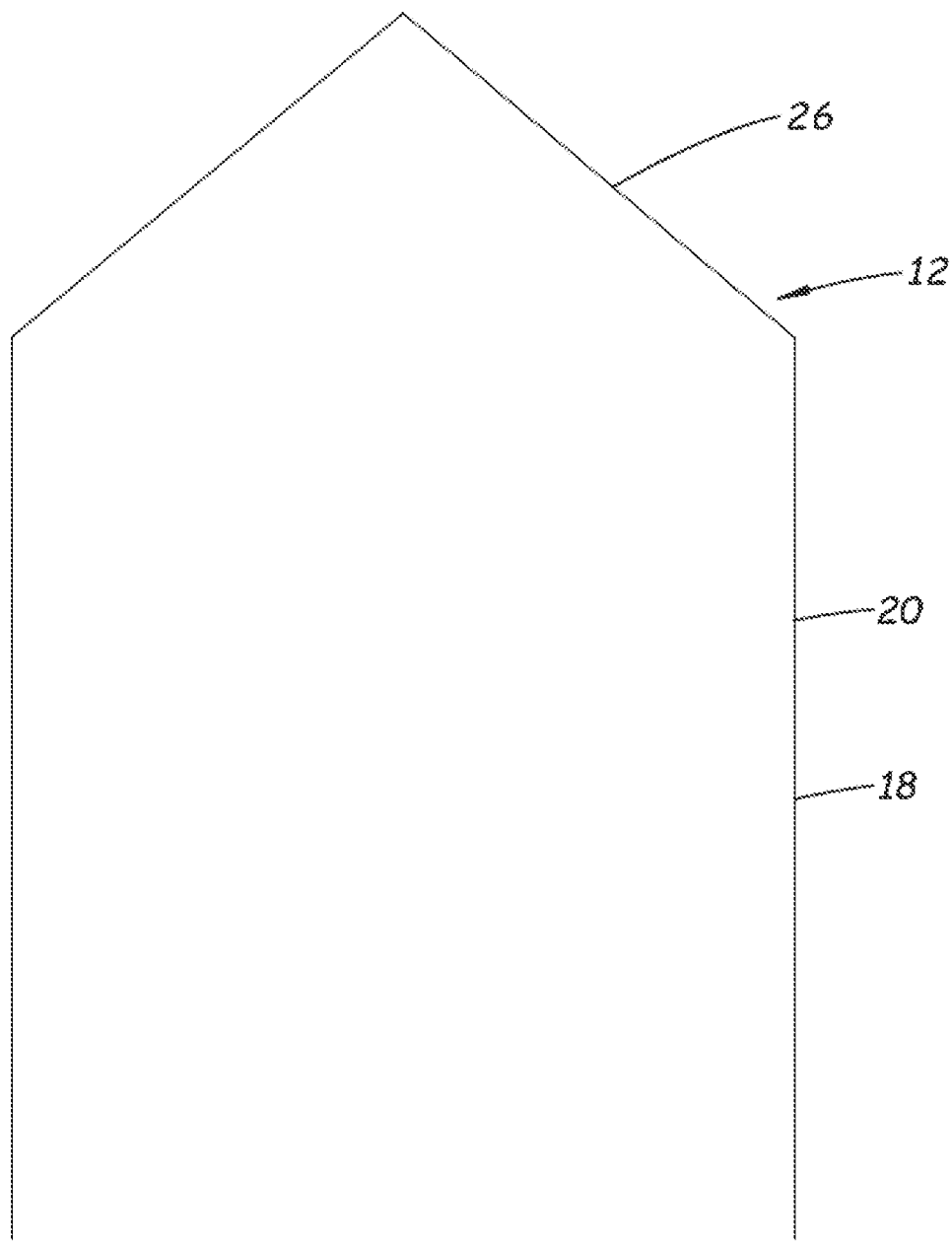
FIG. 2C is a schematic side sectional view of a section of the upper portion with a further configuration of the upper surface of the upper portion, according to an illustrative embodiment.
Figure 3:
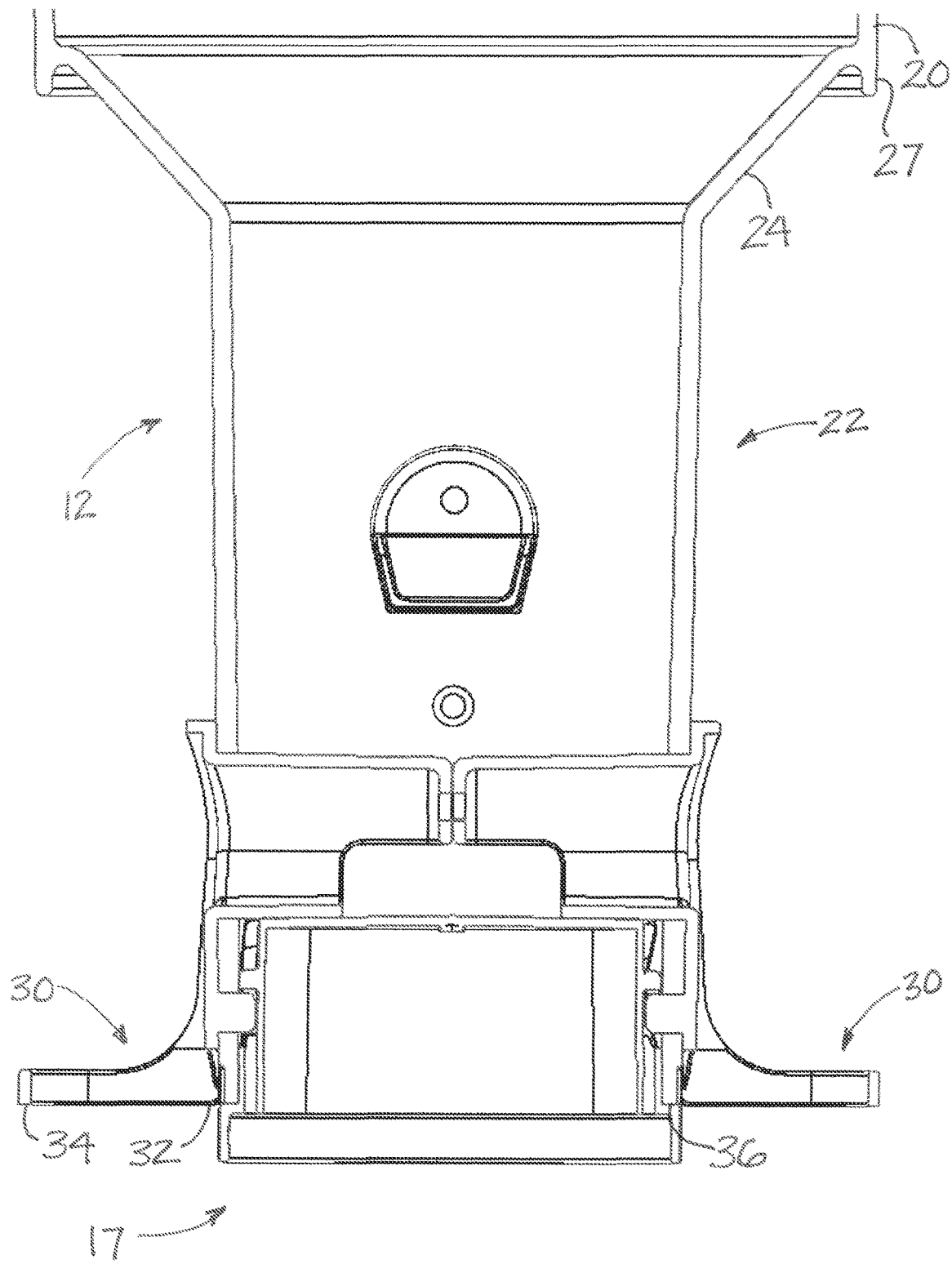
FIG. 3 is a schematic side sectional view of a lower section of the upper portion, the transition portion, and the lower portion of an optional configuration of the feed holder, according to an illustrative embodiment.

FIG. 1 shows a solar panel array 201 on the cap, while FIG. 2 shows a fan 203 within the connecting ring 204, which would be on the underside of the cap. The motor may be connected to the solar panel for power, may alternatively have a battery pack (not shown) within the motor, or may have rechargeable batteries connected to the motor. The motor may have an on-off switch, a timing function, or be remotely controlled (to be used when new moisture may have been present. (e.g., rain, snow, dew, frost, etc.).

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

What is claimed:

1. A birdfeeder apparatus for discouraging squirrels from accessing birdfeed in the birdfeeder apparatus, the apparatus comprising:
  a feed holder configured to contain a quantity of birdfeed, the feed holder having a perimeter wall with an upper portion and a lower portion, the upper portion and the lower portion of the feed holder each having a width;
  at least one feed opening being located on the lower portion and extending through the perimeter wall of the feed holder;
  a perch configured to support a bird feeding at the at least one feed opening, the perch being located adjacent to the at least one feed opening on the lower portion of the perimeter wall and extending outwardly from the perimeter wall;
  wherein the width of the upper portion is larger than the width of the lower portion such that substantially an entirety of the perch is positioned below the upper portion of the feed holder;
  the birdfeeder apparatus further comprising a filler cap on a top of the birdfeeder apparatus, and an air-movement enabling support ring is associated to an interior surface of the filler cap;
  the air-movement enabling support ring having at least 10% of its surface area open to enable air flow through feed in the birdfeeder apparatus to assist in moderating moisture buildup.

2. The apparatus of claim 1 wherein the perch has an inner end adjacent to the perimeter wall and an outer end opposite of the inner end, the perch having a length between the inner and outer ends such that the outer end is positioned under the upper portion, and the air-movement enabling support ring having at least 15% and less than 75% of its surface area open to enable air flow through feed in the birdfeeder apparatus to assist in moderating moisture buildup.

3. The apparatus of claim 1 wherein the perch comprises a perch device configured to be at least partially inserted into one of the feed openings, the perch including: a feed diverter portion insertable through the feed opening into the interior; a wall abutment portion including an engagement peg configured to insert through a positioning hole in the perimeter wall when the feed diverter portion is inserted through the feed opening; a perch portion extending outwardly from the wall abutment portion for extending outwardly from the perimeter wall of the feed holder when the feed diverter portion is inserted through the feed opening; a fill opening formed on the lower portion of the perimeter wall to permit filling of feed into the interior of the feed holder; a filler cap removably mounted on the feed holder to selectively close the fill opening; wherein the filler cap includes an insert portion configured to at least partially insert into the interior of the feed holder through the fill opening, the insert portion having an outer surface for being positioned adjacent to the perimeter wall when the insert portion is inserted into the interior, a locking slot being formed on the outer surface and being configured to receive a portion of the engagement peg of the wall abutment portion of the perch extending through the positioning hole in the perimeter wall to releasably lock the filler cap in a closing position on the lower portion of the perimeter wall.

4. The apparatus of claim 3 wherein the locking slot has an entry portion and a locking portion, the entry portion being in communication with a top end of the insert portion to permit movement of the engagement peg into the slot during initial insertion of the insert portion into the fill opening, and the locking portion being oriented substantially perpendicular to the entry portion to permit rotation of the insert portion with respect to the engagement peg to lock the insert portion of the filler cap in the fill opening.

5. The apparatus of claim 4 wherein a pair of the locking slots are formed on the outer surface of the insert portion.

6. The apparatus of claim 1 wherein an upper end of the upper portion of the feed holder is configured to resist gripping of the upper end by a squirrel.

7. The apparatus of claim 6 wherein the upper end of the feed holder has an upper surface with a dome shape.

8. The apparatus of claim 6 wherein the upper end of the feed holder has an upper surface with an inverted cone shape.

9. The apparatus of claim 6 wherein the upper end of the feed holder has an upper surface with a flat shape without a protruding edge to provide a paw-hold for a squirrel.

10. The apparatus of claim 1 wherein a fill opening is located at an upper end of the perimeter wall, and a filler cap is mounted on the upper end of the feed holder to selectively close the fill opening.

11. The apparatus of claim 10 wherein the filler cap has an upper surface having a dome shape.

12. The apparatus of claim 10 wherein the filler cap has an upper surface having an inverted cone shape.

13. The apparatus of claim 10 wherein the filler cap has an upper surface having a flat shape without a protruding edge to provide a paw-hold for a squirrel.

14. The apparatus of claim 1 wherein the air-movement enabling support ring has at least 10% of its surface area open to enable air flow through a structure comprising alternating teeth and grooves on only one side of the support ring.

15. The apparatus of claim 14 wherein the teeth face upwardly towards the filling cap.

16. The apparatus of claim 14 wherein the teeth face downwardly away from the filling cap.

17. The apparatus of claim 1 wherein a fan and motor are attached within the feeder to assist in air flow within a volume within the wall of the bird feeder.

18. The apparatus of claim 17 wherein the fan and motor are attached to the filler cap.

* * * * *